United States Patent [19]
Harada et al.

[11] Patent Number: 6,018,344
[45] Date of Patent: Jan. 25, 2000

[54] HISTORY DISPLAY APPARATUS

[75] Inventors: Kazumi Harada, Tokyo; Yutaka Tomioka; Fumiyuki Kato, both of Yokohama; Osamu Araki, Kawasaki, all of Japan

[73] Assignee: Matsushita Electric Industrial Co., Ltd., Osaka, Japan

[21] Appl. No.: 08/758,534

[22] Filed: Nov. 29, 1996

[30] Foreign Application Priority Data

Nov. 30, 1995 [JP] Japan .................................. 7-311901

[51] Int. Cl.[7] ........................................................ G06F 3/14
[52] U.S. Cl. .......................... 345/357; 345/440; 345/356; 709/224
[58] Field of Search .................................... 345/440, 326, 345/357; 707/101, 104, 501; 395/200.48, 200.54, 200.75

[56] References Cited

U.S. PATENT DOCUMENTS

| | | | |
|---|---|---|---|
| 5,136,690 | 8/1992 | Becker et al. | 345/349 |
| 5,295,244 | 3/1994 | Dev et al. | 345/357 |
| 5,623,590 | 4/1997 | Becker et al. | 345/326 |
| 5,651,105 | 7/1997 | Willman | 345/440 |
| 5,668,988 | 9/1997 | Chen et al. | 707/101 |
| 5,675,510 | 10/1997 | Coffey et al. | 1/1 |
| 5,694,594 | 12/1997 | Chang | 707/103 X |
| 5,761,436 | 6/1998 | Nielsen | 395/200.75 |

FOREIGN PATENT DOCUMENTS

| | | | |
|---|---|---|---|
| 0457445 | 11/1991 | European Pat. Off. | G06F 15/72 |
| 0551696 | 7/1993 | European Pat. Off. | G06F 15/419 |
| 6208586 | 7/1994 | Japan | G06F 15/40 |

OTHER PUBLICATIONS

Jukherjea S et al: "Visualizing the World–Wide Web with the Navigational View builder", Computer Networks and ISDN Systems, vol. 27, No. 6, Apr. 1995, pp. 1075–1087. XP004013209.

Domel, P.: "WebMap—A graphical Hypertext Navigation Tool", Second International WWW Conference, Oct. 1994, Chicago, XP000542208.

*Primary Examiner*—Raymond J. Bayerl
*Assistant Examiner*—Chadwick A. Jackson
*Attorney, Agent, or Firm*—Lowe Hauptman Gopstein Gilman & Berner

[57] ABSTRACT

In a history display method, positional information and type information are extracted from nodes to be displayed on respective metaphors, thereby allowing a user to intuitively comprehend the nodes in a sense of a map of routes followed among information sources. The history holding section 101 reads a history indicating the routes followed by user from the memory unit 105 and holds the history. The history geographical analyzing section 102 analyzes geographical information contained in the history. The history managing section 103 controls the result of the analysis of the history. The history display section 104 displays the history analysis result by use of metaphor display along with a node connection relationship. The novel constitution provides the user with a new clue namely geographical information for accessing desired nodes and displays the history on a map metaphor, thereby allowing the user to intuitively comprehend the nodes in a sense of a map of routes followed among information sources.

16 Claims, 33 Drawing Sheets

FIG. 2

| | |
|---|---|
| MEI Home Page | http://www.mei.co.jp/ 〜201 |
| Welcome to the White House | http://www.whitehouse.gov/White House/Family/html/First.Family.html 〜202 |
| Switzerland-Home | http://heiwww.unige.ch/switzerland/ 〜203 |
| Australian Web Servers-interactive | http://www.csu.edu.au/links/ozmap.html 〜204 |

FIG. 4

| Page Title | URL | Country |
|---|---|---|
| MEI Home Page | http://www.mei.co.jp/ | Japan |
| Welcome to the White House | http://www.whitehouse.gov/White House/Family/html/First.Family.html | United States |
| Switzerland-Home | http://heiwww.unige.ch/switzerland/ | Switzerland |
| Australian Web Servers-interactive | http://www.csu.edu.au/links/ozmap.html | Australia |

FIG. 8

| Page Title | URL | Type |
|---|---|---|
| MEI Home Page | http://www.mei.co.jp/ | — |
| Welcome to the White House | http://www.whitehouse.gov/White House/Family/html/First.Family.html | Government |
| Switzerland-Home | http://heiwww.unige.ch/switzerland/ | Computer and Internet |
| Australian Web Servers-interactive | http://www.csu.edu.au/links/ozmap.html | Computer and Internet |

FIG. 11

| | |
|---|---|
| Wed Jul 26 21:19:MEI Home Page | http://www.mei.co.jp/ |
| Wed Jul 26 21:27:Switzerland-Home | http://heiwww.unige.ch/switzerland/ |
| Wed Jul 26 21:40:Welcome to the White House | http://www.whitehouse.gov/White House/ |
| Wed Jul 26 21:45:Switzerland-Home | http://heiwww.unige.ch/switzerland/ |
| Wed Jul 26 21:47:Australian Web Servers -interactive | http://www.csu.edu.au/links/ozmap.html |
| Wed Jul 26 21:48:Switzerland-Home | http://heiwww.unige.ch/switzerland/ |

FIG. 12

| Page Title URL | URL | Country | Access Frequency |
|---|---|---|---|
| MEI Home Page | http://www.mei.co.jp/ | Japan | 1 |
| Welcome to the White House | http://www.whitehouse.gov/White House/ | United States | 1 |
| Switzerland-Home | http://heiwww.unige.ch/switzerland/ | Switzerland | 3 |
| Australian Web Servers-interactive | http://www.csu.edu.au/links/ozmap.html | Australia | 1 |

| Access Frequency | Magnification |
|---|---|
| $0 \leqq X \leqq 0.1$ | 0.2 |
| $0.1 < X \leqq 0.5$ | 0.6 |
| $0.5 < X \leqq 1.0$ | 0.8 |
| $1.0 < X \leqq 2.0$ | 1 |
| $2.0 < X \leqq 3.0$ | 1.2 |
| $4.0 < X \leqq 5.0$ | 1.4 |
| $5.0 < X$ | 2.0 |

FIG. 16

| Area | Access Frequency |
|---|---|
| Japan | 10 |
| Australia/Oceania | 1 |
| Asia | 0.5 |
| Europe | 3 |
| Middle East | 0.5 |
| Africa | 0.7 |
| North America | 5 |
| Central America | 0.2 |
| South America | 0.2 |

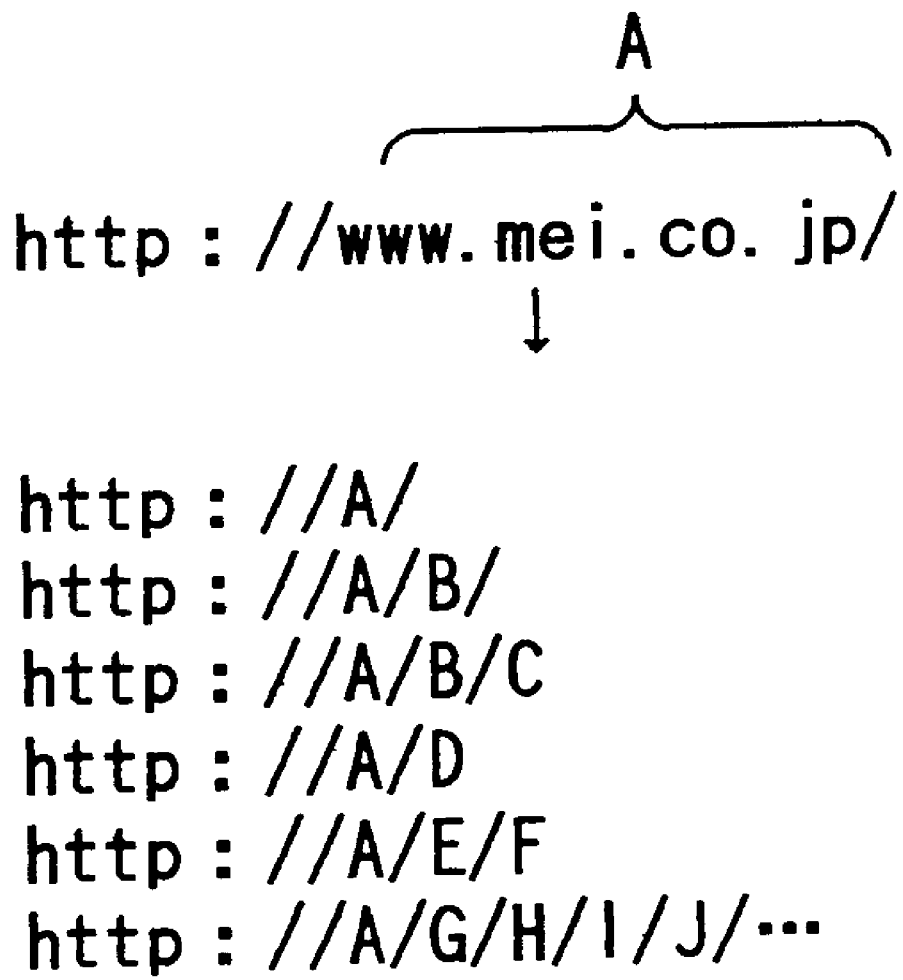

FIG. 21

| Page Title | URL | |
|---|---|---|
| MEI Home Page | http://www.mei.co.jp/ | 2101 |
| WWW servers in the world | http://www.mei.co.jp/pointers/www-world.html | 2102 |
| Welcome to the White House | http://www.whitehouse.gov/White House/Family/html/First.Family.html | 2103 |
| Welcome to the White House | http://www.whitehouse.gov/White House/Family/html/Life.html | 2104 |
| Welcome to the White House | http://www.whitehouse.gov/White House/Family/image/raw/bill-socks-outside.gif | 2105 |
| Switzerland-Home | http://heiwww.unige.ch/switzerland/ | 2106 |
| Australian Web Servers-interactive | http://www.csu.edu.au/links/ozmap.html | 2107 |
| Australian Web Servers-New South | http://www.csu.edu.au/cgi-bin/imagemap/ausmap?493,341 | 2108 |
| Australian Web Servers-Sydney | http://www.csu.edu.au/cgi-bin/imagemap/nswservers?351,200 | 2109 |

FIG. 22

| Page Title | URL | Country | Parentage |
|---|---|---|---|
| MEI Home Page | http://www.mei.co.jp/ | Japan | Parent |
| WWW servers in the world | http://www.mei.co.jp/pointers/www-world.html | Japan | Child |
| Welcome to the White House | http://www.whitehouse.gov/White House/Family/html/First.Family.html | United-States | Parent |
| Welcome to the White House | http://www.whitehouse.gov/White House/Family/html/Life.html | United-States | Child |
| Welcome to the White House | http://www.whitehouse.gov/White House/Family/image/raw/bill-socks-outside.gif | United-States | Child |
| Switzerland-Home | http://heiwww.unige.ch/switzerland/ | Switzerland | Parent |
| Australian Web Servers-interactive | http://www.csu.edu.au/links/ozmap.html | Australia | Parent |
| Australian Web Servers-New South | http://www.csu.edu.au/cgi-bin/imagemap/ausmap?493,341 | Australia | Child |
| Australian Web Servers-Sydney | http://www.csu.edu.au/cgi-bin/imagemap/nswservers?351,200 | Australia | Child |

FIG. 26

| Page Title | URL | Parentage | Link |
|---|---|---|---|
| MEI Home Page | http://www.mei.co.jp/ | Parent | — |
| MEI Information | http://www.mei.co.jp/Info | Child | link |
| WWW servers in the world | http://www.mei.co.jp/pointers/www-world.html | Child | link |
| Welcome to the White House | http://www.whitehouse.gov/White House/Family/html/First.Family.html | Parent | link |
| Switzerland-Home | http://heiwww.unige.ch/switzerland/ | Parent | no link |
| Australian Web Servers-interactive | http://www.csu.edu.au/links/ozmap.html | Parent | link |

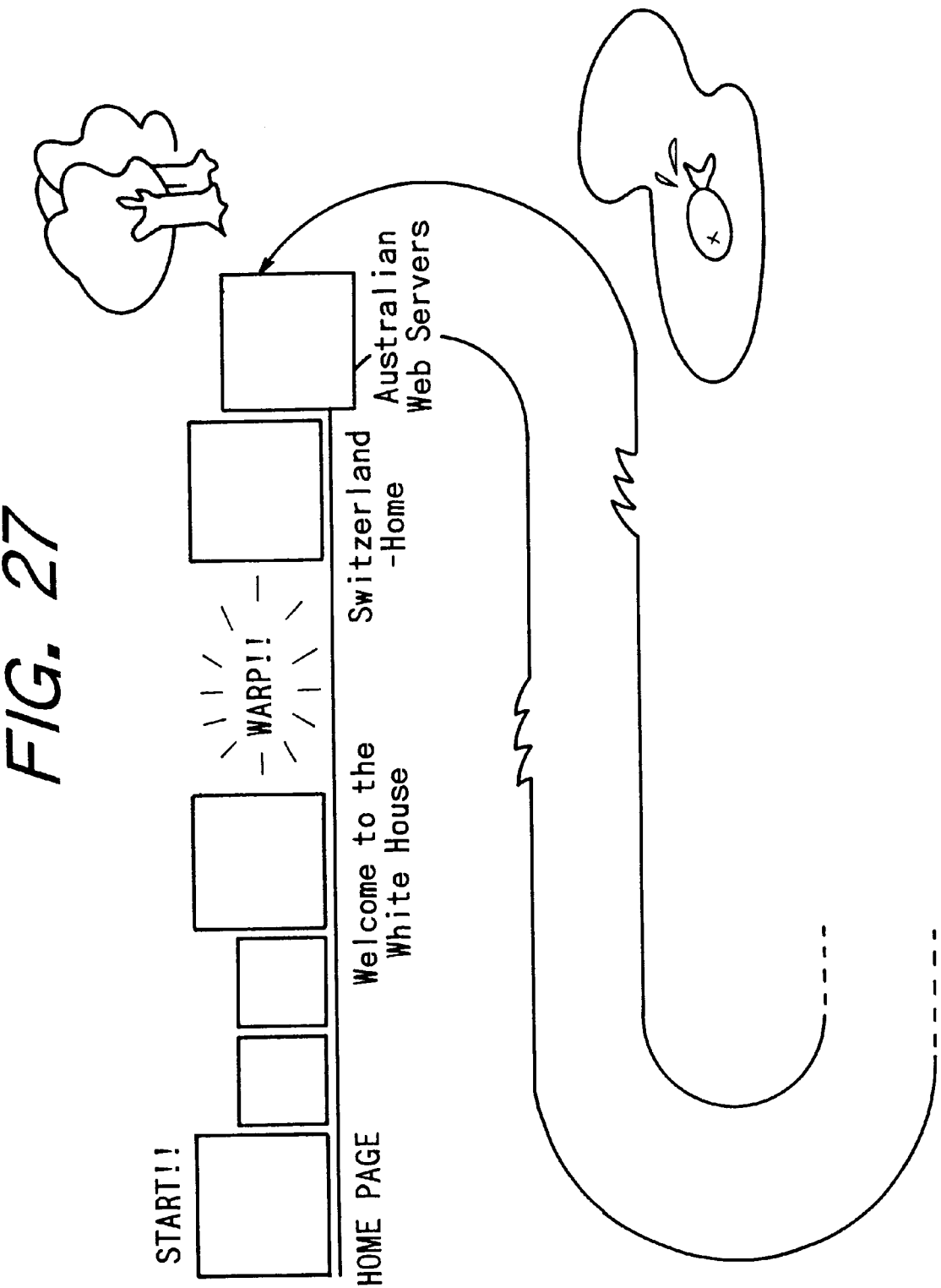

FIG. 30

| Display Order | Page Title | URL | |
|---|---|---|---|
| 01 | MEI Home Page | http://www.mei.co.jp/ | |
| 02 | MSRL Information | http://www.mei.co.jp/Info | link |
| 03 | WWW servers in the world | http://www/pointers/www-world.html | link |
| 04 | Welcome to the White House | http://www.whitehouse.gov/White House/Family/html/First.Family.html | link |
| 05 | *System Error* | http://heiwww.unige.ch/switzerland/ | |
| 06 | Australian Web Servers-interactive | http://www.csu.edu.au/links/ozmap.html | link |

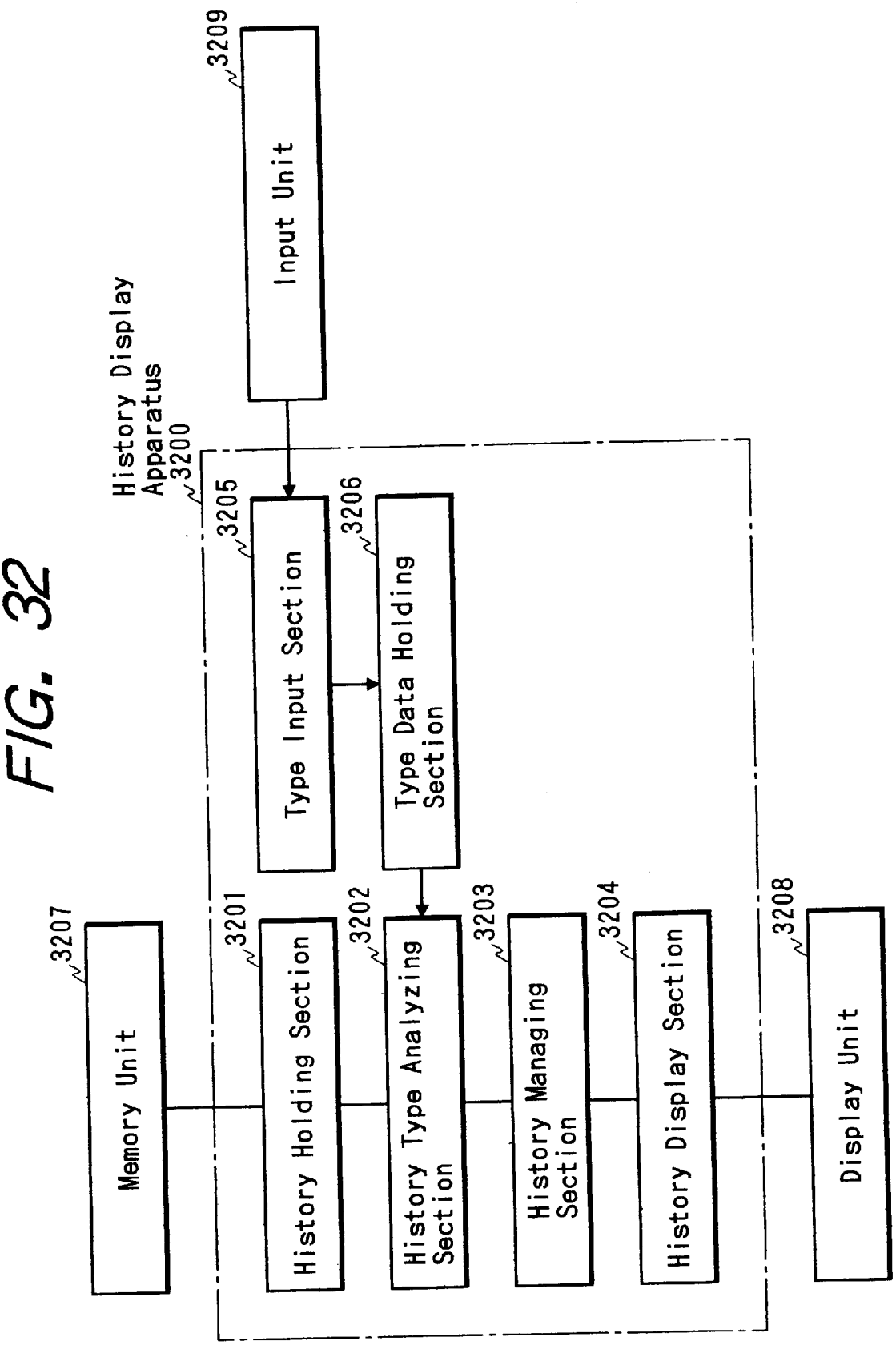

FIG. 33

| Codes from ISO 3166<br>Updated by the RIPE Network Coordination Centre, in<br>coordination with the ISO 3166 Maintenance Agency, Berlin | | | |
|---|---|---|---|
| Country | A2 | A3 | Number |
| AFGHANISTAN | AF | AFG | 004 |
| ALBANIA | AL | ALB | 008 |
| ALGERIA | DZ | DZA | 012 |
| AMERICAN SAMOA | AS | ASM | 016 |
| ANDORRA | AD | AND | 020 |
| ANGORA | AO | AGO | 024 |
| ANGUILLA | AI | AIA | 660 |
| ANTARCTICA | AQ | ATA | 010 |
| ANTIGUA AND BARBUDA | AG | ATG | 028 |
| ARGENTINA | AR | ARG | 032 |
| ARMENIA | AM | ARM | 051 |
| ARUBA | AW | ABW | 533 |
| AUSTRALIA | AU | AUS | 036 |
| AUSTRIA | AT | AUT | 040 |
| AZERBAIJAN | AZ | AZE | 031 |
| BAHAMAS | BS | BHS | 044 |
| BAHRAIN | BH | BHR | 048 |
| BANGLADESH | BD | BGD | 050 |
| BARBADOS | BB | BRB | 052 |
| BELARUS | BY | BLR | 112 |
| BELGIUM | BE | BEL | 056 |
| BELIZE | BZ | BLZ | 084 |
| BENIN | BJ | BEN | 204 |
| . | . | . | . |
| . | . | . | . |

HISTORY DISPLAY APPARATUS

BACKGROUND OF THE INVENTION

1. Field of the Invention

The present invention generally relates to an information supplying system using a display apparatus associated with a computer, and more specifically to a history display apparatus for displaying a history of operations by a user in a system having a hypermedia structure in which the user moves between information sources by following links provided between nodes.

2. Description of the Prior Art

In a system having a hypermedia structure, information can be browsed by following links provided between nodes. In conventional hypermedia systems, however, a problem may often occur in which a path that one has followed is lost and he cannot return to a desired location or one becomes unable to make out his whereabouts in the system. This problem is generally known as the problem of lost path in the hypermedia system.

Conventional systems often have history files that tell the routes one has followed. Generally, most of such history files simply list character information in the order in which one has been browsing. Some of the history files indicate the hypermedia links in a tree structure to allow grasping of the connection state of the links, while others show the nodes in images reduced in size.

Problem Intended to Be Solved by the Invention

However, the above-mentioned methods of displaying the history in the conventional hypermedia systems involve the following problems. First, because the history simply lists the nodes in temporal order, one cannot grasp the node to access at a glance. For example, the history of an Internet browser (viewing software) shows only URLs (Uniform Resource Locators) that indicate the titles and addresses of pages concerned. Therefore, such a simple listing hardly matches a sense of the routes a user has followed so far among information sources, thereby making it troublesome for the user to locate desired pages from among the character strings.

The conventional history display methods do not appropriately show access frequency information, so that the user cannot make distinction between nodes frequently accessed and nodes seldom accessed. Namely, the conventional methods do not take into consideration the visual representation of the access frequency information.

The conventional history display methods do not take into consideration the visual representation of user preferences, so that distinction is hardly made between frequently accessed type and/or regions and seldom accessed type and/or regions ("type" is used to mean genre or category in this specification). Namely, user preferences are not formed in a map which visually represents them.

Displaying all the accessed nodes on a map increases the numbers of nodes and links too much. And, although the user often remembers the nodes having parentage in a group, the conventional display methods show the nodes without parental distinction.

As for a conventional history display method in which history display of nodes having a hypermedia structure represents structural information, the structure itself is represented by a tree structure. Therefore, the link structure is seen as it is, making the history display too complex to grasp for users who are novice or not very familiar with computers.

The conventional methods do not provide such information other than node history as a system error in tracing past history, providing the user with no clue in the tracing.

Type classification based on existing node lists does not match the conceptual system held by the user.

SUMMARY OF THE INVENTION

It is therefore a first object of the present invention is to provide, with regard to a method of displaying access history in a hypermedia system, a history display apparatus for extracting positional information and type information obtained from nodes and displaying the extracted information on respective metaphors, thereby allowing the user to intuitively grasp the nodes in a sense of a map of the routes that the user has followed so far among information sources.

A second object of the present invention is to provide, with regard to a method of displaying access history in a hypermedia system, a history display apparatus for representing node access frequency information with elements that allow the user to intuitively grasp the node access frequency information by representing the same on a map through the difference between display states.

A third object of the present invention is to provide, with regard to a method of displaying access history in a hypermedia system, a history display apparatus for visually representing user preferences by representing frequently accessed type/regions and seldom accessed type/regions by use of access frequency information through the difference between display states.

A fourth object of the present invention is to provide, with regard to a method of displaying access history in a hypermedia system, a history display apparatus for representing the relationship between the nodes and links on a map in a simple and easy-to-understand manner by representing only the parent node of a group of nodes having parentage.

A fifth object of the present invention is to provide, with regard to a method of displaying access history in a hypermedia system, a history display apparatus for allowing users who are novice or not well familiar with computers to easily understand node access histories by displaying time axis and the parentage of nodes in the hypermedia structure.

A sixth object of the present invention is to provide, with regard to a method of displaying access history in a hypermedia system, a history display apparatus for providing a better clue for finding desired nodes by displaying on a metaphor not only the node history information but also a system status, thereby allowing the user to find out the desired nodes.

A seventh object of the present invention is to provide, with regard to a method of displaying access history in a hypermedia system, a history display apparatus for allowing the user to enter desired type and have results of the entry in the form of a list; this allows the user to have the type list matching the conceptual system of the user for type, thereby providing a clue namely type information which is well matched with the consciousness of the user.

In carrying out the invention and according to the first aspect thereof, there is provided, in a system having a hypermedia structure in which a user moves from one information source to another by following links provided between nodes, a history display apparatus comprising: a history holding section for holding a history of the following of the links by the user; a history geographical information analyzing section for analyzing geographical information held by the history; a history managing section for managing results obtained by analyzing the history; and a history display section for displaying the analysis results along with a node connection information by use of metaphor display.

In carrying out the invention and according to the second aspect thereof, there is provided a history display apparatus further comprising a history type analyzing section instead of the history geographical analyzing section wherein a node list containing nodes by type is referenced in the history type analyzing section to determine a type to which each of the nodes in the history of the movement of the user.

In carrying out the invention and according to the third aspect thereof, there is provided a history display apparatus further comprising an access frequency information acquiring section for acquiring frequency of access by the user to each of the nodes and a history display control section for changing display states of each of the nodes according the access frequency thereof wherein the history display apparatus also displays the access frequency information.

In carrying out the invention and according to the fourth aspect thereof, there is provided a history display apparatus further comprising an area-classified frequency information collecting section for collecting information about access frequency by area and a history display control section for changing display states of a region to be mapped according to access frequency, thereby varying a portion to be mapped, wherein the history display apparatus also displays information about access frequency by region or type.

In carrying out the invention and according to the fifth aspect thereof, there is provided a history display apparatus further comprising a history structure analyzing section for analyzing parentage of the nodes, wherein the history display section displays not the history of all of the nodes but the history in units of a parent node having a child node.

In carrying out the invention and according to the sixth aspect thereof, there is provided a history display apparatus further comprising an operation history acquiring section for acquiring operation history of the user instead of the history geographical analyzing section, wherein the history display section displays, by use of metaphor display, time axis and parentage of nodes in the structure held in the history.

In carrying out the invention and according to the seventh aspect thereof, there is provided a history display apparatus further comprising a system status acquiring section for acquiring system status, wherein the history display section displays the system status.

In carrying out the invention and according to the eighth aspect thereof, there is provided a history display apparatus further comprising a type input section for the user to enter type of the nodes and a type data holding section for holding the nodes and type entered from the type input section in a list.

In one aspect of the invention, a history display apparatus, in the system having a hypermedia structure in which a user moves from one information source to another by following links provided between nodes, comprises: a history holding section for holding a history of the following of the links by the user; a history geographical information analyzing section for analyzing geographical information held by the history; a history managing section for managing results obtained by analyzing the history; and a history display section for displaying the analysis results along with a node connection information by use of metaphor display. This novel constitution is advantageous in that, in the system having a hypermedia structure in which a user moves among information sources by following links provided between nodes, geographical information is analyzed based on a history of the following of the links by the user and a result of the analysis along with a connection relationship of the nodes is displayed by use of metaphor display, thereby allowing the user to have a new clue namely the geographical information and intuitively comprehend the nodes in a sense of a map of routes followed by the user among the information sources by displaying the geographical information on the map.

In another aspect of the invention, the history display apparatus comprises a history type analyzing section instead of the history geographical analyzing section wherein a node list containing nodes by type is referenced in the history type analyzing section to determine a type to which each of the nodes in the history of the movement of the user. This novel constitution is advantageous in that, in the system having a hypermedia structure in which a user moves among information sources by following links provided between nodes, a type of a history of the following of the links by the user is analyzed by referencing a node list containing a list of nodes by type and a result of the analysis along with a connection relationship of the nodes is displayed by use of metaphor display, thereby allowing the user to have type information and intuitively comprehend the nodes in a sense of a map of routes followed by the user among the information sources based on the type information.

In another aspect of the invention, the history display apparatus comprises an access frequency information acquiring section for acquiring frequency of access by the user to each of the nodes and a history display control section for changing display states of each of the nodes according the access frequency thereof. This novel constitution is advantageous in that, in the system having a hypermedia structure in which a user moves from one information source to another by following links provided between nodes, information about frequency of access to each of the nodes based on a history of the follow-up by the user is analyzed and the access frequency information is expressed on a map along with a connection relationship of the nodes by a difference between node display states, thereby allowing the user also to intuitively grasp the access frequency information about each of the nodes.

In still another aspect of the invention, the history display apparatus comprises an area-classified frequency information collecting section for collecting information about access frequency by area and a history display control section for changing display states of a region to be mapped according to access frequency, thereby varying a portion to be mapped, wherein the history display apparatus also displays information about access frequency by region or type. This novel constitution is advantageous in that, in the system having a hypermedia structure in which a user moves from one information source to another by following links provided between nodes, access frequency information by area is collected and analyzed, a display state of a region to be mapped is varied, and a type/region frequently accessed and a type/region seldom accessed are expressed by a difference between display states, thereby expressing a trend of user preferences visually.

In yet another aspect of the invention, the history display apparatus further comprises a history structure analyzing section for analyzing parentage of the nodes, wherein said history display section displays not the history of all of the nodes but the history in units of a parent node having a child node (namely in units of home pages providing covers). This novel constitution is advantageous in that, in the system having a hypermedia structure in which a user moves from one information source to another by following links provided between nodes, node parentage is analyzed and not all the nodes are displayed but, as for a group of nodes having parentage, only a parent node is displayed, thereby expressing a relationship between the nodes and the links on map around a main page with more ease of understanding and simplicity.

In still another aspect of the invention, the history display apparatus comprises an operation history acquiring section for acquiring operation history of the user instead of the history geographical analyzing section, wherein the history display section displays, by use of metaphor display, time axis and parentage of nodes in the structure held in the history. This novel constitution is advantageous in that, in the system having a hypermedia structure in which a user moves from one information source to another by following links provided between nodes, parentage of the nodes is analyzed and the time axis and node parentage necessary for identifying not all link information in a history but a desired node in a structure held in the history are displayed by use of metaphor display, thereby allowing the user who is novice or not well familiar with computers to understand the system easily.

In still another aspect of the invention, the history display apparatus comprises a system status acquiring section for acquiring system status, wherein said history display section displays the system status. This novel constitution is advantageous in that, in the system having a hypermedia structure in which a user moves from one information source to another by following links provided between nodes, a system status is analyzed and a result of the analysis is displayed along with a history by use of a metaphor, thereby increasing the number of clues to allow the user to identify a desired node more easily.

In still another aspect of the invention, the history display apparatus comprises a type input section for the user to enter type of the nodes and a type data holding section for holding the nodes and type entered from said type input section in a list. This novel constitution is advantageous in that, in the system having a hypermedia structure in which a user moves from one information source to another by following links provided between nodes, the user enters a desired type and holds a result of the entry in the form of a list, by which a type list matching a conceptual system of the user for the type and a clue namely type information better matching the consciousness of the user is provided, thereby allowing the user to intuitively comprehend the nodes in a sense of a map of routes followed by the user among the information sources based on the type information.

In still another aspect of the invention, in the system having a hypermedia structure in which a user moves among information sources by following links provided between nodes, analyzes geographical information based on a history of the following of the links by the user and displays a result of the analysis along with a connection relationship of the nodes by use of metaphor display. This novel constitution is advantageous in that the user can have a new clue namely the geographical information and intuitively comprehend the nodes in a sense of a map of routes followed by the user among the information sources by displaying the geographical information on the map.

In still another aspect of the invention, in the system having a hypermedia structure in which a user moves among information sources by following links provided between nodes, analyzes a type of a history of the following of the links by the user by referencing a node list containing a list of nodes by type and displays a result of the analysis along with a connection relationship of the nodes by use of metaphor display. The novel constitution is advantageous in that the user can have type information and intuitively comprehend the nodes in a sense of a map of routes followed by the user among the information sources based on the type information.

In still another aspect of the invention, in the system having a hypermedia structure in which a user moves among information sources by following links provided between nodes, analyzes information about frequency of access to each of the nodes based on a history of the follow-up by the user and expresses the access frequency information on a map along with a connection relationship of the nodes by a difference between node display states. This novel constitution is advantageous in that the user also can intuitively grasp the access frequency information about each of the nodes.

In still another aspect of the invention, in the system having a hypermedia structure in which a user moves among information sources by following links provided between nodes, access frequency information by area is collected and analyzed, varies a display state of a region to be mapped, and expresses a type/region frequently accessed and a type/region seldom accessed by a difference between display states. This novel constitution is advantageous in that a trend of user preferences can be expressed visually.

In still another aspect of the invention, in the system having a hypermedia structure in which a user moves among information sources by following links provided between nodes, displays node parentage is analyzed and not all the nodes but, as for a group of nodes having parentage, displays only a parent node. This novel constitution is advantageous in that a relationship between the nodes and the links can be expressed on map around a main page with more ease of understanding and simplicity.

In still another aspect of the invention, in the system having a hypermedia structure in which a user moves among information sources by following links provided between nodes, analyzes parentage of the nodes and displays the time axis and node parentage necessary for identifying not all link information in a history but a desired node in a structure held in the history by use of metaphor display. This novel constitution is advantageous in that the user who is novice or not well familiar with computers can understand the system easily.

In still another aspect of the invention, in the system having a hypermedia structure in which a user moves among information sources by following links provided between nodes, analyzes a system status and displays a result of the analysis along with a history by use of a metaphor. This novel constitution is advantageous in that more clues are given to allow the user to identify a desired node more easily.

In still another aspect of the invention, in the system having a hypermedia structure in which a user moves among information sources by following links provided between nodes, wherein the user enters a desired type and holds a result of the entry in the form of a list, by which a type list matching a conceptual system of the user for the type and a clue namely type information better matching the consciousness of the user is provided. This novel constitution is advantageous in that the user can intuitively comprehend the nodes in a sense of a map of routes followed by the user among the information sources based on the type information.

BRIEF DESCRIPTION OF THE DRAWINGS

These objects and features of the present invention will become more readily apparent from the following detailed description of the preferred embodiments taken in conjunction with the accompanying drawings in which:

FIG. 2 shows an example of the history in the first embodiment;

FIG. 4 shows an example of the control table held in the history control section in the first embodiment;

FIG. 8 is a list indicating an example of the control table held in the history managing section in the second embodiment;

FIG. 11 is a list indicating an example of the access history held in the history holding section in the third embodiment;

FIG. 12 is a list indicating an example of the control table held in the history managing section in the third embodiment;

FIG. 13 is a list indicating an example of the magnification table held in the history display control section in the third embodiment;

FIG. 16 is a list indicating an example of the table of frequency information by area in the fourth embodiment;

FIG. 20 is a list indicating an example of URL analysis in the fifth embodiment;

FIG. 21 is a list indicating an example of the history in the fifth embodiment;

FIG. 22 is a list indicating an example of the control table held in the history managing section in the fifth embodiment;

FIG. 26 is a list indicating is an example of the control table held in the history managing section in the sixth embodiment;

FIG. 27 is a history map that can easily be understood also by those users who are novice or not well familiar with computers;

FIG. 30 is a list indicating an example of the control table held in the history managing section in the seventh embodiment;

FIG. 32 is a block diagram illustrating a constitution of the history display apparatus practiced as the eighth embodiment of the invention; and FIG. 33 is a list indicating a part of the country codes specified in the ISO-3166 as used in the first embodiment.

In the figures, like reference characters designate like or corresponding parts throughout:

DETAILED DESCRIPTION OF THE INVENTION (First Embodiment)

Figure 1:
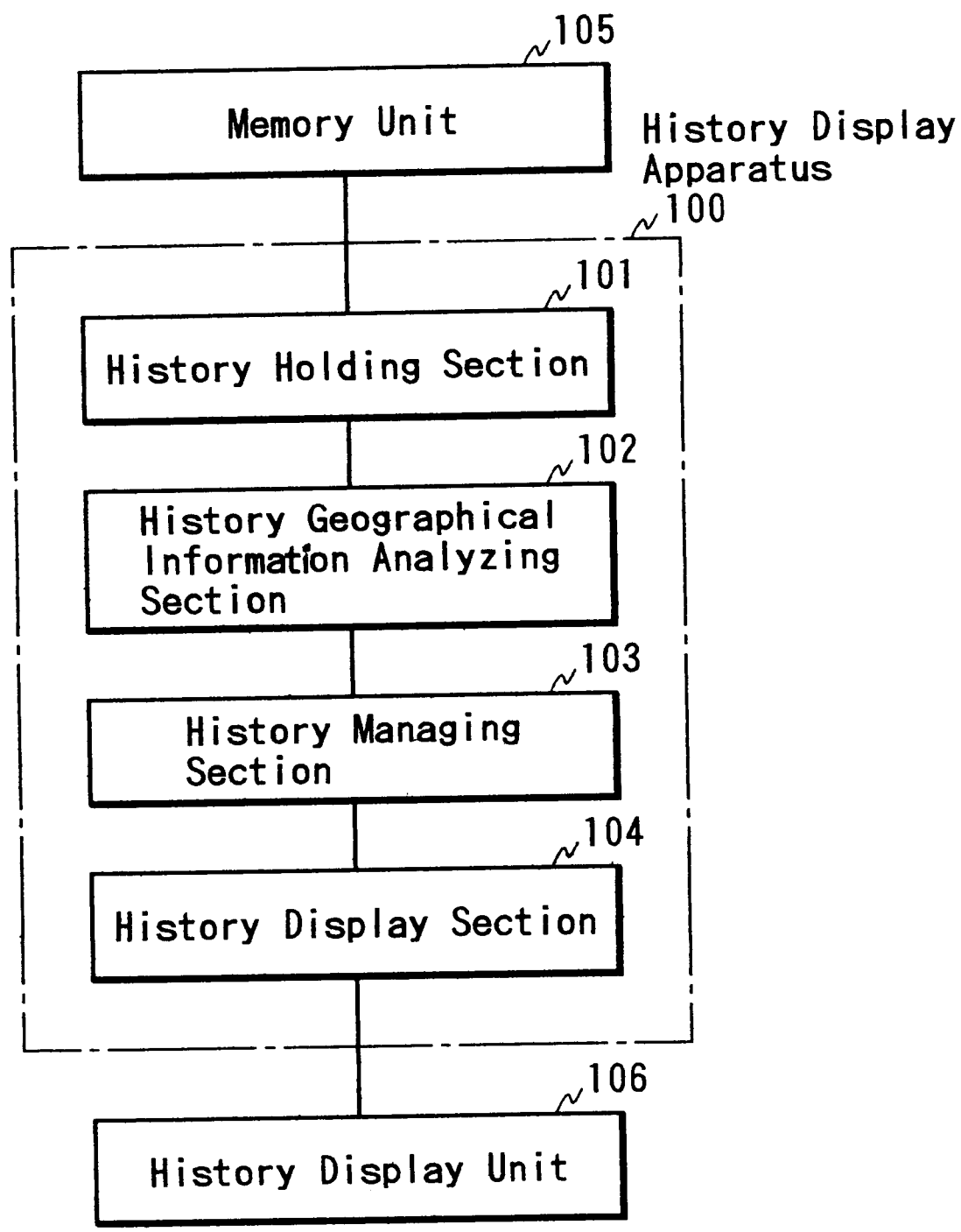
FIG. 1 is a block diagram illustrating a constitution of the history display apparatus practiced as the first embodiment of the present invention.

The following describes in detail the first embodiment of the present invention with reference to drawings. FIG. 1 is a block diagram illustrating a constitution of the history display apparatus practiced as the first embodiment of the present invention. In FIG. 1, the history display apparatus according to the present invention is generally depicted by a reference numeral 100. The history display apparatus 100 comprises a history holding section 101 for holding a history of the following by the user by reading the history from a memory unit 105, a history geographical information analyzing section 102 for analyzing geographical information contained in the history, a history managing section 103 for managing the result of analyzing the history, a history display section 104 for displaying the history analysis result by use of metaphor display along with node connection relationship. The memory unit 105 for storing the user access history to be used by the history display apparatus 100 is shown to be associated with the history display apparatus 100. Reference numeral 106 indicates a display unit for displaying the processing result of the history display apparatus 100.

Although it is not specifically shown in the drawings, the history display apparatus 100 as well as the corresponding apparatus in the following embodiments is actually formed by a computer including at least one cpu (central processing unit), memories and interfaces.

The following describes the operations of the history display apparatus thus constituted. The following description will be made by using an example in which a WWW server is accessed on the Internet. A page hereinafter referred to is equivalent to a node. First, the user access history is read from the memory unit 105 to be held in the history holding section 101. FIG. 2 shows an example of the history in which WWW servers were accessed sequentially on the Internet. As shown in the example, the titles of the accessed pages and the URLs indicating the addresses of these pages are listed in the order of access. The figure shows only a part of the list.

Figure 3:
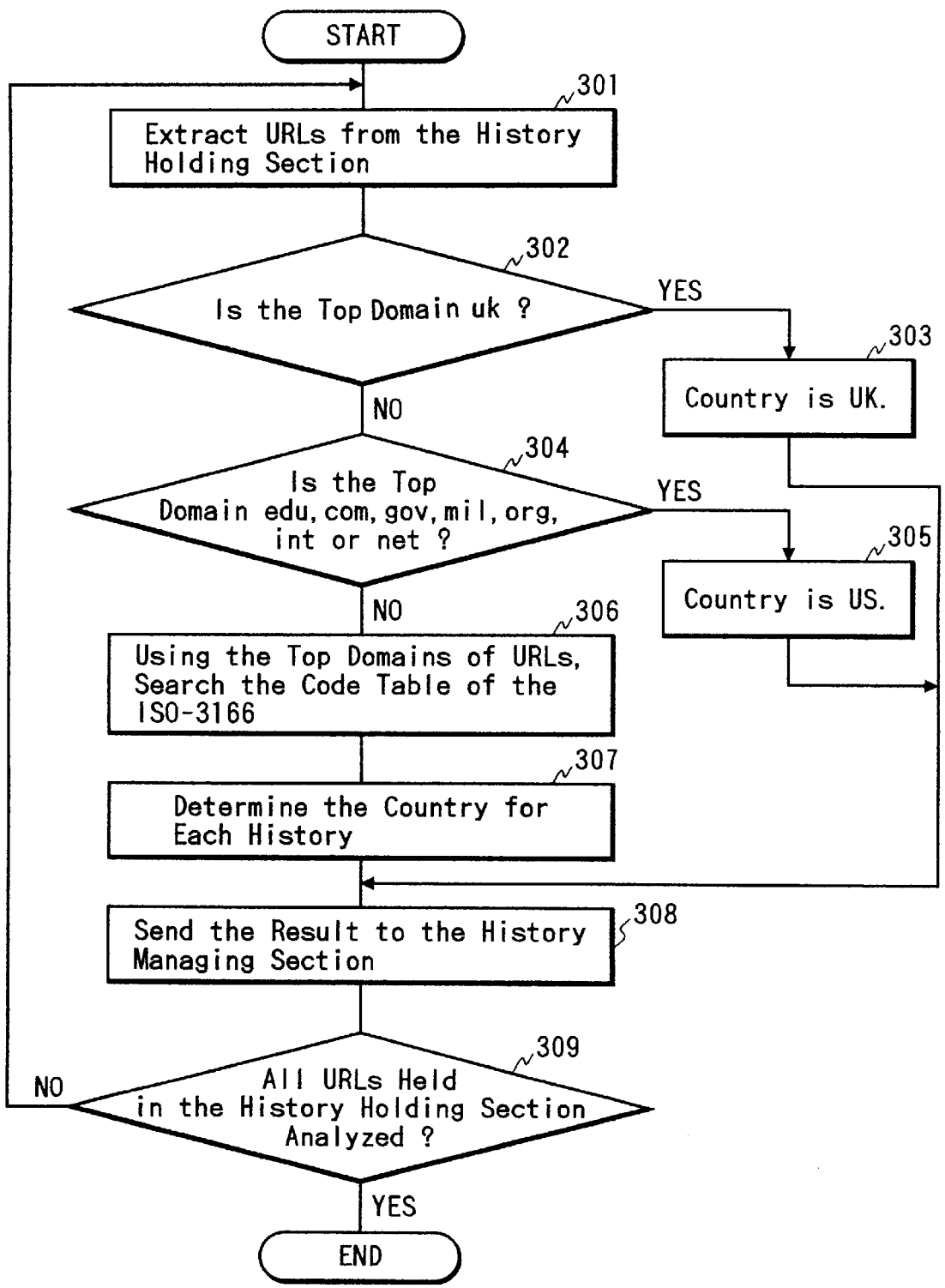
FIG. 3 is a flowchart indicating the processing by the history geographical information analyzing section in the first embodiment.

Then, in the history geographical information analyzing section 102, information is obtained indicating which page is in which country over the world. FIG. 3 is a flowchart indicating the processing by the history geographical information analyzing section 102. First, the URLs are extracted from the history holding section 101 (step 301) to determine the countries from the top domains contained in the URLs (steps 302 through 307). In addressing on the Internet, the top domains are expressed in the ISO-3166 codes. Exceptions are edu, com, gov, mil, org, int, and net of the United States and uk (gb in the ISO-3166) of the United Kingdom. In the United States, the us domain is also used. FIG. 33 shows a part of the countries around the world specified in the ISO-3166. Using that the URL contains an Internet address, the URL is analyzed based on this code table to obtain information that indicates which country created each page. For example, reference numeral 201 of FIG. 2 indicates Japan because the top domain is jp. Reference numeral 202 indicates the United States because the top domain is gov. Reference numeral 203 indicates Switzerland because the top domain is ch. Reference numeral 204 indicates Australia because the top domain is au. The results of these analyses are passed to the history control section 103 (step 308). Such analyses are performed on all URLs (step 309).

The history control section 103 has a history control table and adds the result obtained in the history geographical information analyzing section 102 to the table.

Figure 5:
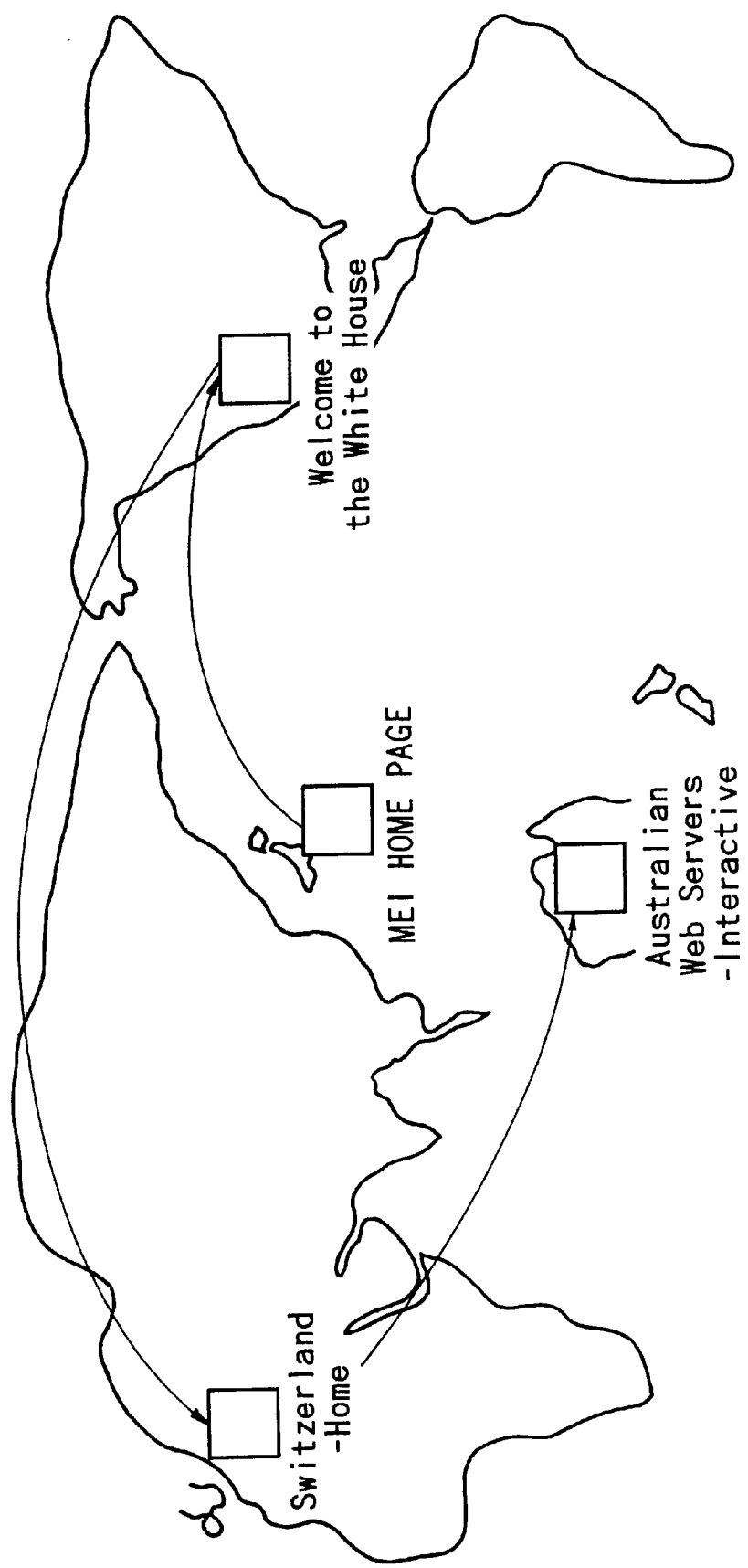
FIG. 5 is a history map with information by country in the first embodiment.

FIG. 4 shows an example of the control table obtained by analyzing the history held in the history control section 103. Then, in the history display section 104, the analysis result of the history is displayed on a world map metaphor by use of the information of the history control section 103 along with a node connection relationship. FIG. 5 shows a history map with information classified by country as displayed on the display unit 106 by the history display section 104.

As described and according to the above-mentioned embodiment, in the system having a hypermedia structure in which a user moves among information sources by following links provided between nodes, the user is given a new clue namely the geographical information and is allowed to intuitively comprehend the nodes in a sense of a map of routes followed by the user among the information sources by displaying the geographical information on the map metaphor.

(Second Embodiment)

The following describes in detail the second embodiment of the present invention with reference to drawings. The second embodiment differs from the first embodiment in that a history type analyzing section is provided instead of the history geographical information analyzing section. In this history type analyzing section, a node list is referenced to determine the type to which the nodes accessed by the user belong.

Figure 6:
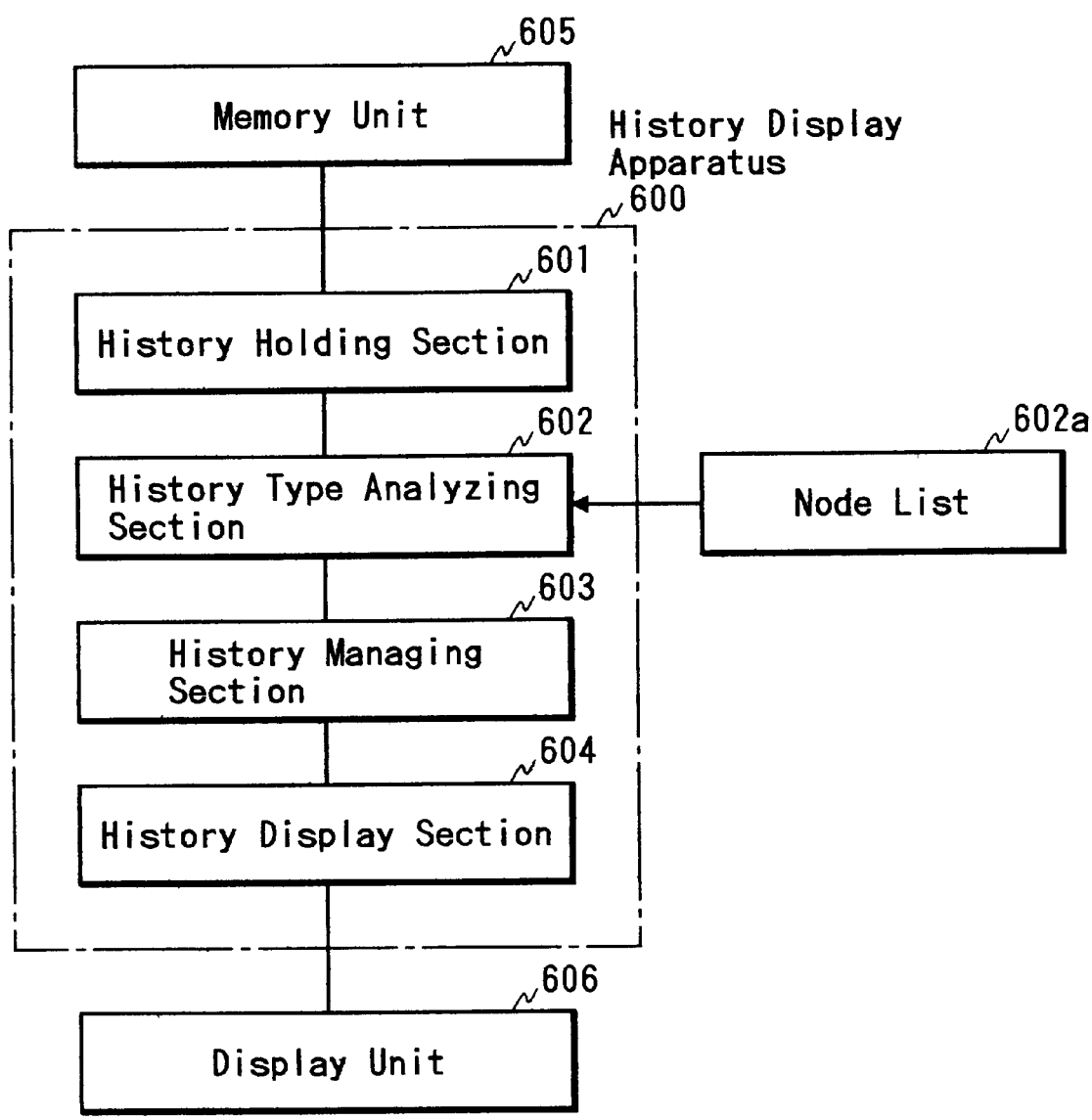
FIG. 6 is a block diagram illustrating a constitution of the history display apparatus practiced as the second embodiment.

FIG. 6 is a block diagram illustrating a constitution of the history display apparatus practiced as the second embodiment. In FIG. 6, reference numeral 600 indicates a history display apparatus associated with the invention. Reference numeral 601 indicates a history holding section for holding a history of the following by the user by reading the history from a memory unit 605. Reference numeral 602 indicates a history type analyzing section for determining a type to which the nodes in the history accessed by the user belong by referencing a node list 602*a*. Reference numeral 603 indicates a history managing section for managing the result of analyzing the history. Reference numeral 604 indicates a history display section for displaying the history analysis result by use of metaphor display along with node connection relationship. Reference numeral 605 indicates the memory unit for storing the user access history to be used by the history display apparatus 600. Reference numeral 606 indicates a display unit for displaying the processing result of the history display apparatus 600. It should be appreciated that, for the node list 602*a*, an existing search server such as Yahoo in which the nodes are classified by type may be used or the equivalent may be created for use. Further, the node list 602*a* may reside in the history display apparatus 600.

Figure 7:
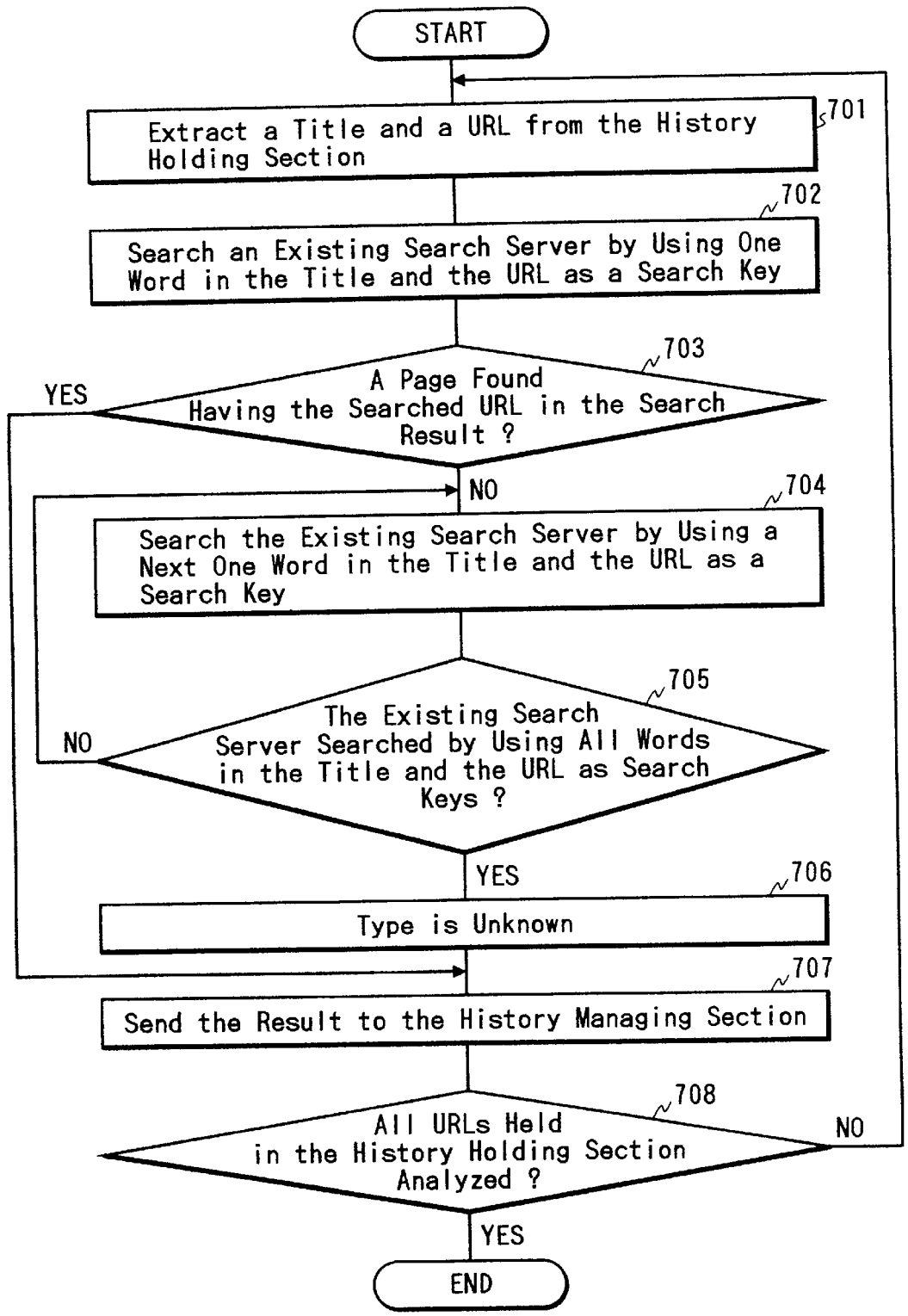
FIG. 7 is a flowchart indicating the processing by the history type analyzing section in the second embodiment.

FIG. 7 is a flowchart indicating the processing by the history type analyzing section 602. The following description is made by using an example in which a type is identified by use of an existing search server. In the history type analyzing section 602, search is performed in Yahoo by use of the title and URL of the access history of the user held in the history holding section 601 as search keys (step 701). Yahoo is a node list having a hierarchical structure classified by type and serves as a search server on the Internet that allows search by use of keywords and URLs as search keys. Using the Yahoo search engine, a search is performed (steps 702 through 706). For example, the type of the page indicated by reference numeral 202 of FIG. 2 is found "Government," while the type of the pages indicated by reference numerals 203 and 204 is "Computer and Internet." Because the page indicated by reference numeral 201 is a home page of the user, no type analysis is performed. The results of these analyses are passed to the history control section 603 (step 707) as with the first embodiment. These analyses are performed on all URLs (step 708).

Figure 9:
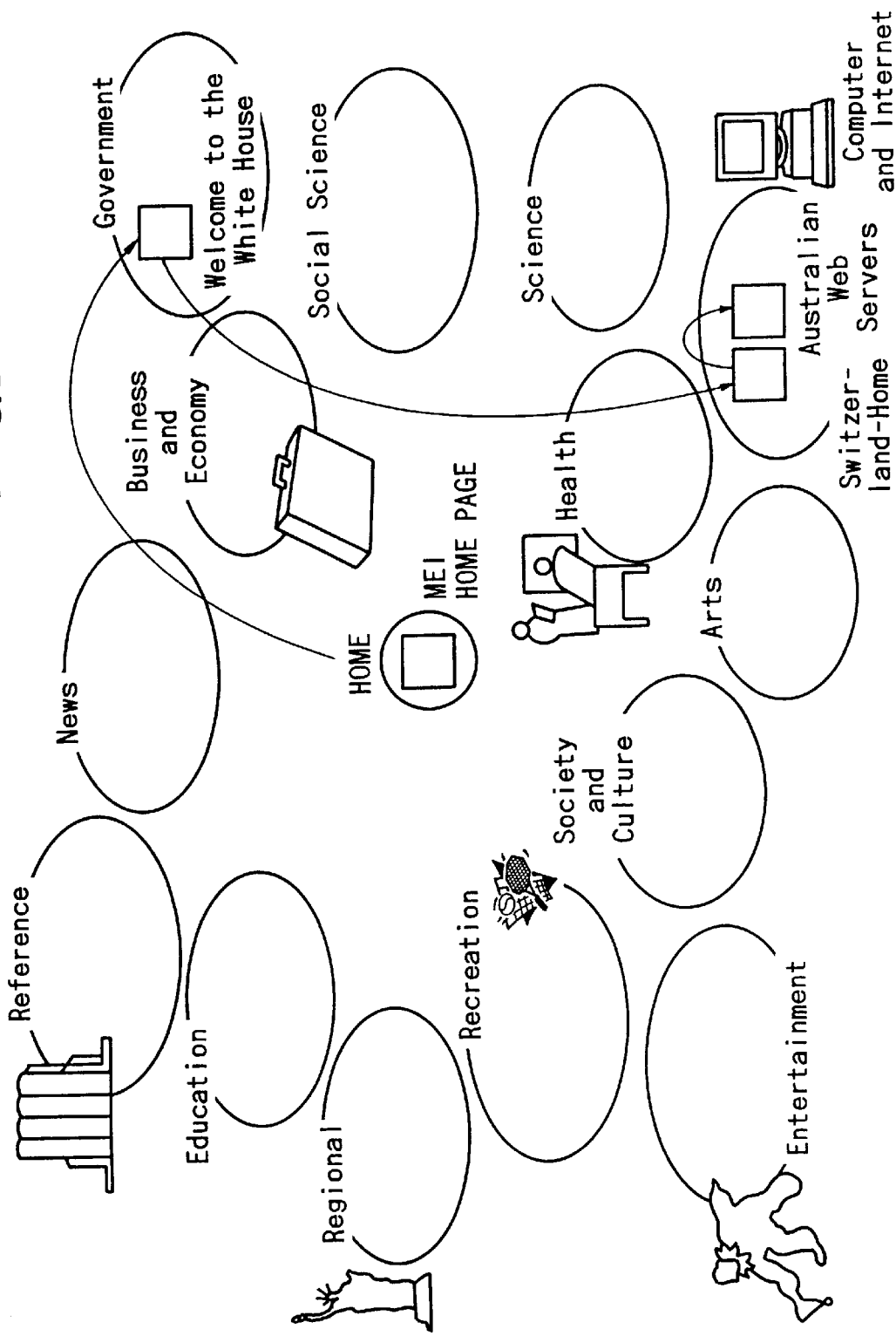
FIG. 9 is a history diagram with information by type in the second embodiment.

In the history control section 603, the results obtained in the history type analyzing section 602 are added to the table as with the first embodiment. FIG. 8 shows an example of the control table obtained by analyzing the history held in the history control section 603. Then, in the history display section 604, the history analysis results are displayed on a type metaphor along with a node connection relationship by use of the information held in the history control section 603. FIG. 9 shows a history diagram attached with the information by type displayed on the display unit 606 by the history display section 604.

As described and according to the present embodiment, in the system having a hypermedia structure in which a user moves among information sources by following links provided between nodes, the user is given type information to intuitively comprehend the nodes in a sense of a map of routes followed by the user among the information sources based on the type information.

(Third Embodiment)

The following describes in detail the third embodiment with reference to drawings. The third embodiment differs from the first embodiment in that, in the history holding section, access date is read from the memory unit in addition to the title and URL of each page and an access frequency information acquiring section for acquiring access frequency of the user for each node and a history display control section for changing display states to be displayed according to the access frequency are provided. The display states to be changed according to the access frequency include area, color, color shade, luminance, and enhanced display such as display pattern. In the present example, the display area is varied.

Figure 10:
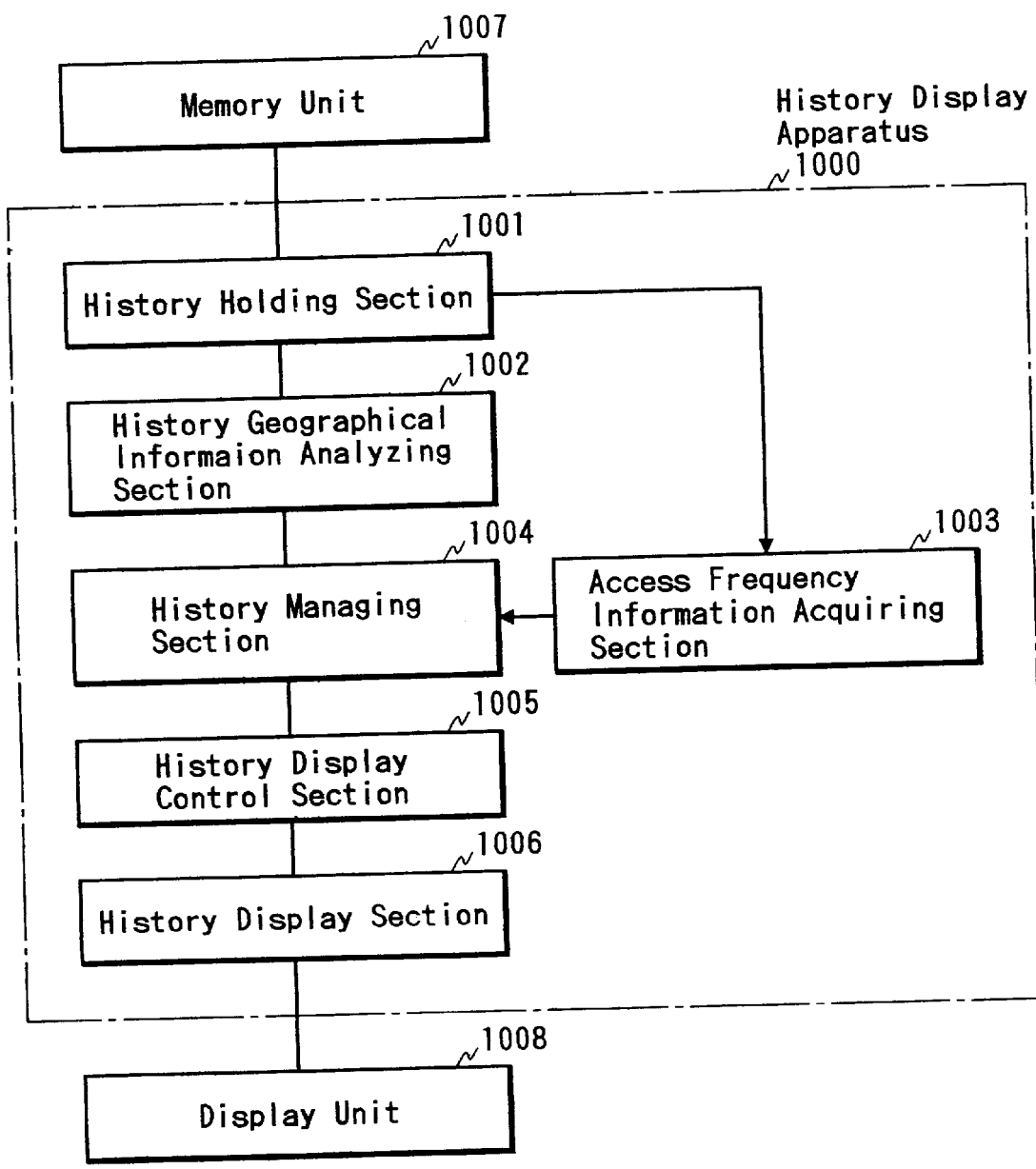
FIG. 10 is a block diagram illustrating a constitution of the history display apparatus in the third embodiment.

FIG. 10 is a block diagram illustrating a constitution of the history display apparatus practiced as the third embodiment of the invention. In FIG. 10, reference numeral 1000 indicates the history display apparatus associated with the present invention. Reference numeral 1001 indicates a history holding section for holding a history of the following by the user by reading the history from a memory unit 1007. Reference numeral 1002 indicates a history geographical information analyzing section for analyzing geographical information contained in the history. Reference numeral 1003 indicates an access frequency information acquiring section for acquiring access frequency of the user for each node. Reference numeral 1004 indicates a history managing section for managing the result of analyzing the history. Reference numeral 1005 indicates a history display control section for varying an area to be displayed according to access frequency. Reference numeral 1006 indicates a history display section for displaying the results of history analysis by use of metaphor display along with a node connection relationship. Reference numeral 1007 indicates the memory unit for storing the user access history to be used by the history display apparatus 1000. Reference numeral 1008 indicates a display unit for displaying the processing result of the history display apparatus 1000.

FIG. 11 shows an example of the access history held in the history holding section 1001. In addition to the titles and URLs of pages, access dates are read from the memory unit 1007. In this example, it is found that "Switzerland—Home: http://www.unige.ch/switzerland/" was accessed three times in the same day. Hence, in the access frequency information acquiring section 1003, the access count per unit time for each page is captured. The result of the capture is passed to the history managing section 1004 as access frequency information. In the history managing section 1004, the result obtained in the access frequency information acquiring section 1003 is added to the table as with the above-mentioned first and second embodiments.

FIG. 12 shows an example of the control table having the access frequency for each page in the history managing section 1004. For pages 1202 through 1204, access frequencies 1, 3 and 1 respectively are stored in the control table as access frequencies per day. Page 1201 is a page set by the user as a home page, access frequency is not counted.

Figure 14:
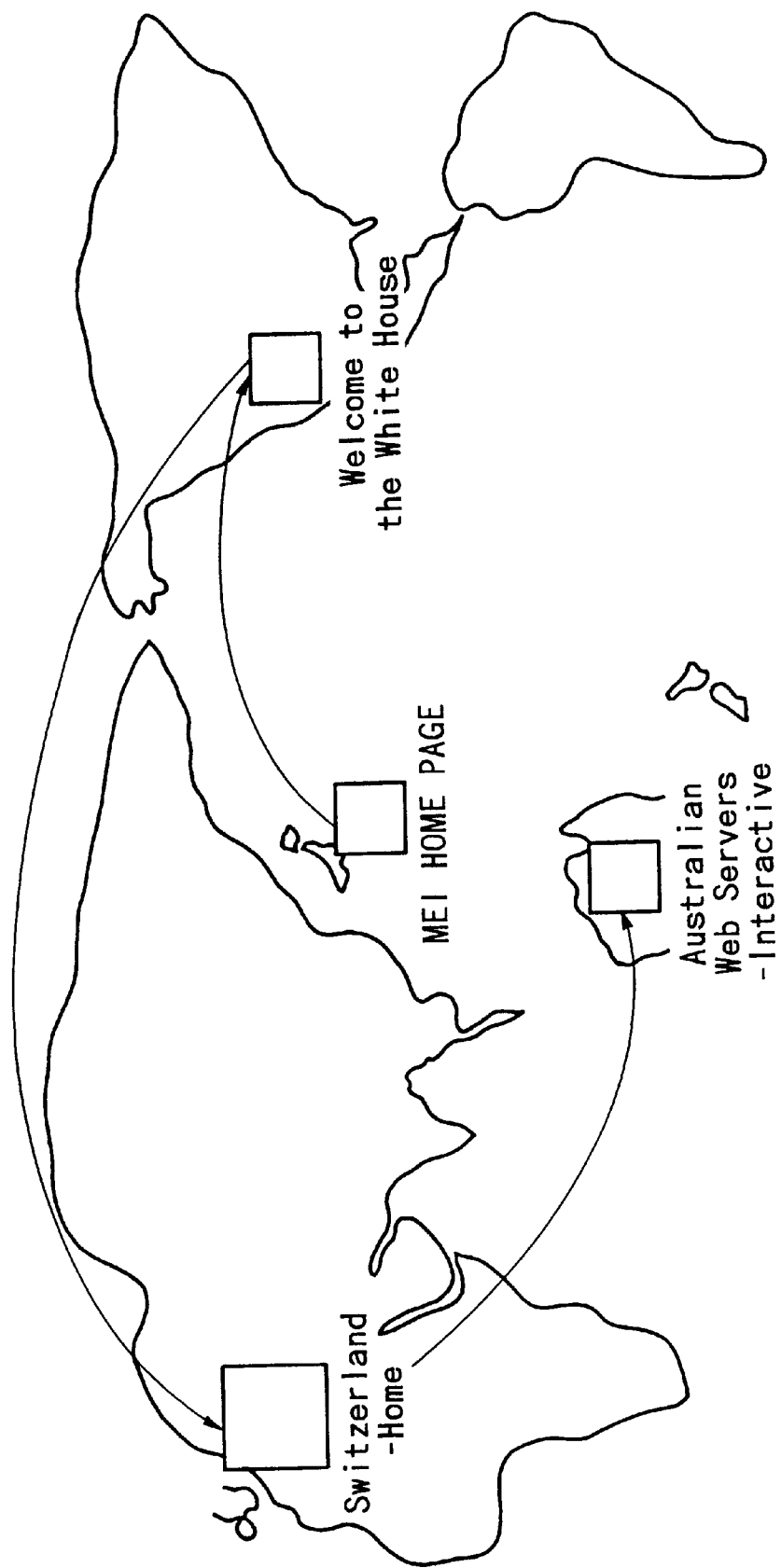
FIG. 14 is a history map with frequency information in the third embodiment.

The following describes the history display control section 1005. FIG. 13 shows a magnification table for the page display for the access frequencies held in the history display control section 1005. The history display control section 1005 instructs the history display section 1006 to vary the area to be displayed according to the access frequency passed from the history managing section 1004. Finally, in the history display section 1006, nodes having different areas according to the access frequencies are displayed on the map by use of the information of the history managing section 1004 and the information of the history display control section 1005. FIG. 14 shows the history map with frequency information displayed on the display unit 1008 by the history display apparatus 1000.

As described and according to the present embodiment, in the system having a hypermedia structure in which a user moves among information sources by following links provided between nodes, information about frequency of access to each of the is expressed on a map along with a connection relationship of the nodes by the difference between node display states, thereby allowing the user also to intuitively grasp the access frequency information about each of the nodes.

It should be appreciated that the present embodiment can be practiced in combination with any of the first and second embodiments.

(Fourth Embodiment)

The following describes in detail the fourth embodiment. The fourth embodiment differs from the above-mentioned third embodiment in that an area-classified frequency information collecting section for collecting access frequency information by area is provided and a history display control section changes display states of a portion to be mapped according to access frequency to change the mapped portion, thereby also displaying access frequency information by area or type. The display states to be changed according to the access frequency include area, color, color shade, luminance, and enhanced display such as display pattern. In the present example, the display area is varied.

Figure 15:
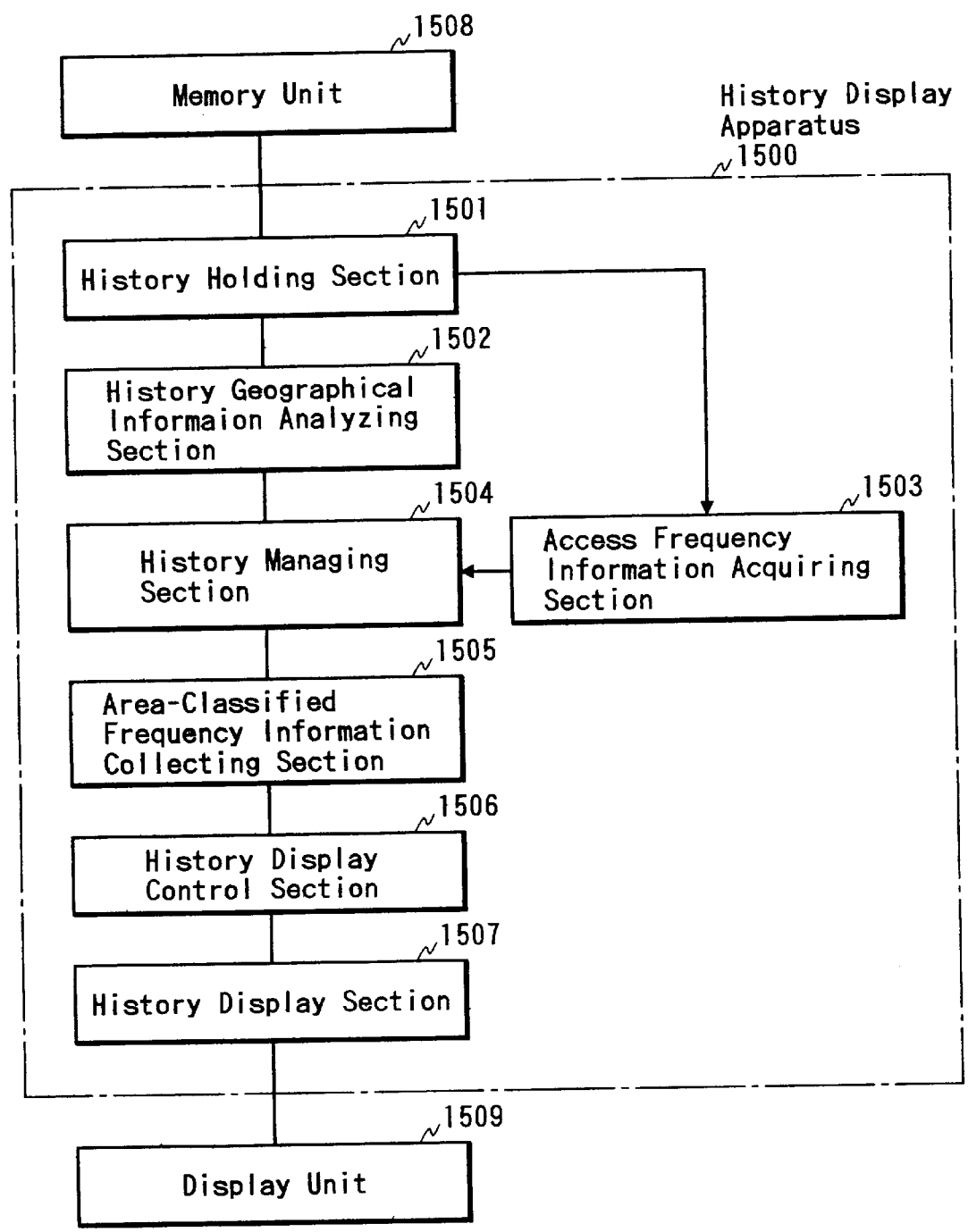
FIG. 15 is a block diagram illustrating a constitution of the history display apparatus practiced as the fourth embodiment of the invention.

FIG. 15 is a block diagram illustrating a constitution of the history display apparatus practiced as the fourth embodiment of the invention. In FIG. 15, reference numeral 1500 indicates the history display apparatus associated with the present invention. Reference numeral 1501 indicates a history holding section for holding a history of the following by the user by reading the history from a memory unit 1508. Reference numeral 1502 indicates a history geographical information analyzing section for analyzing geographical information contained in the history. Reference numeral 1504 indicates a history managing section for managing the result of analyzing the history. Reference numeral 1505 indicates an area-classified frequency information collecting section for collecting access information by area. Reference numeral 1506 indicates history display control section for varying the area to be displayed according to access frequency. Reference numeral 1507 indicates a history display section for displaying the history analysis result by use of metaphor display along with a node connection relationship. Reference numeral 1508 indicates the memory unit for storing the user access history to be used by the history display apparatus 1500. Reference numeral 1509 indicates a display unit for displaying the processing result of the history display apparatus 1500.

FIG. 16 shows an area-classified frequency information table held in the area-classified frequency information collecting section 1505. An area denotes one of portions obtained by dividing the world by an arbitrary number. The access frequency is obtained by dividing the access count summed for each area by a unit time. The page which the user set as a home page is not counted for access frequency as with the above-mentioned third embodiment.

Figure 17:
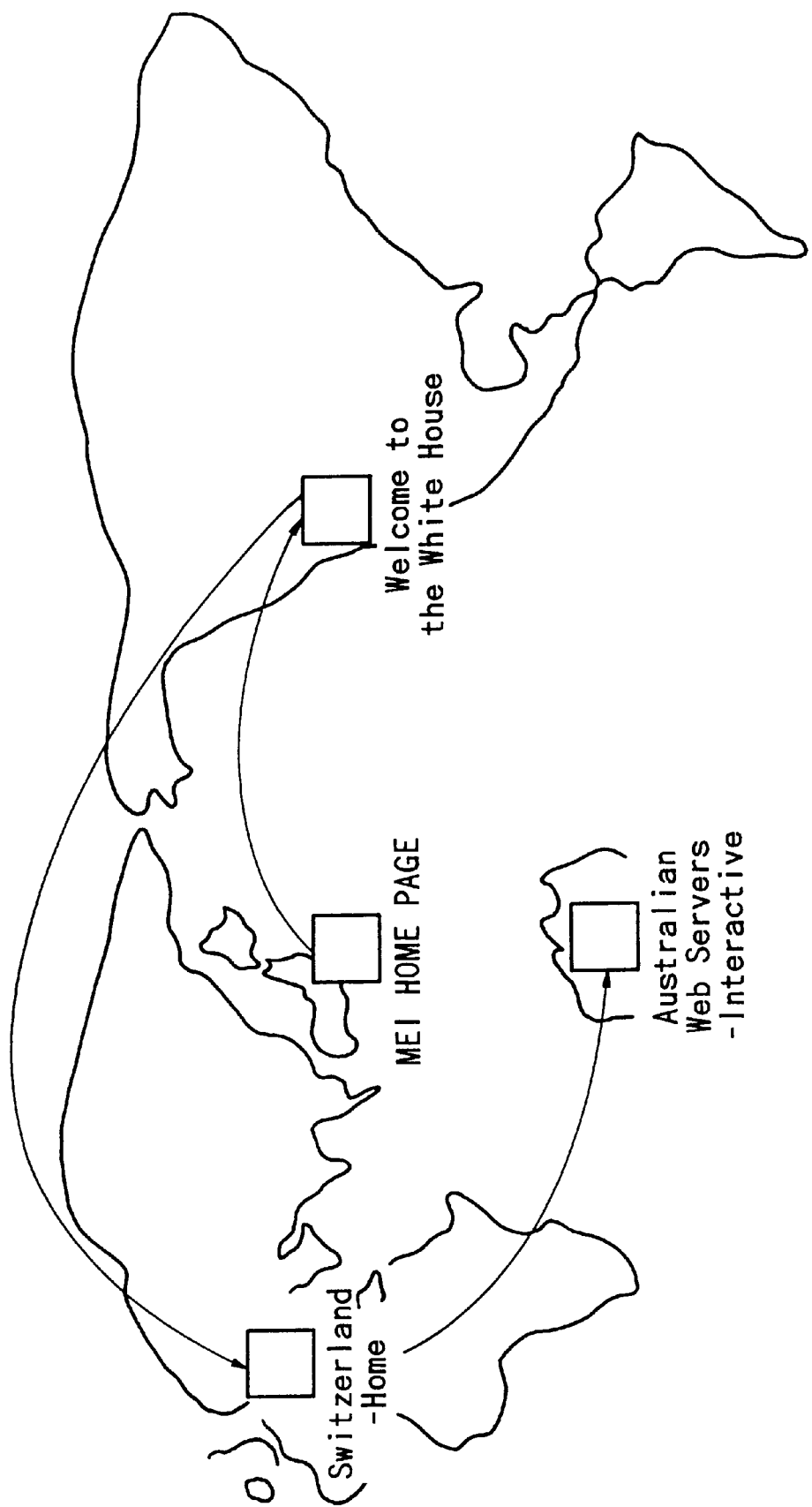
FIG. 17 is a history map with frequency information by area in the fourth embodiment.

Based on the area-classified access frequency information, the history display control section 1506 instructs the history display section 1507 to vary the area of a region to be mapped according to access frequency to change the mapped portion. FIG. 17 shows a history map with the area-classified frequency information displayed on the display unit 1509 by the history display section 1507.

In the present embodiment, the access frequency of the user is displayed as the access frequency by area by summing the access frequency information by area and changing the map. It will be apparent that the access frequency information can be summed by type and, according to the resultant access frequency, the area of the type to be mapped is changed to change the type map, thus displaying the access frequency information as the access the frequency information by type.

As described and according to the present embodiment, in the system having a hypermedia structure in which a user moves from one information source to another by following links provided between nodes, access frequency information by area is collected and analyzed, a display state of a region to be mapped is varied, and a type/region frequently accessed and a type/region seldom accessed are expressed by a difference between display states, thereby expressing a trend of user preferences visually.

It should be appreciated that the present embodiment can be practiced in combination with any of the first and second embodiments.

(Fifth Embodiment)

The following describes in detail the fifth embodiment with reference to drawings. The fifth embodiment differs from the first embodiment in that a history structure analyzing section for analyzing the parentage of nodes is provided and a history display section displays not all the nodes but the parent nodes having child nodes.

Figure 18:
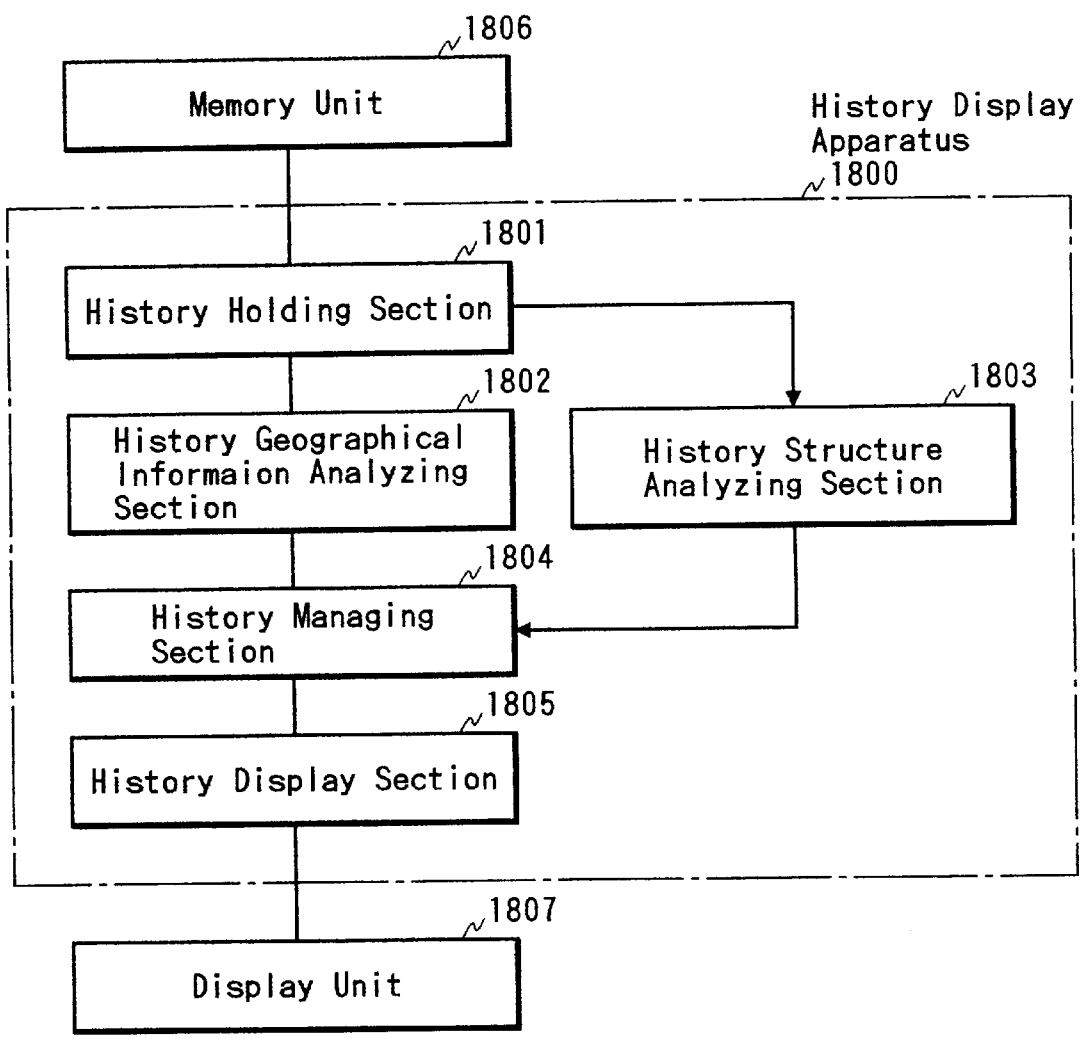
FIG. 18 is a block diagram illustrating a constitution of the history display apparatus practiced as the fifth embodiment of the invention.

FIG. 18 is a block diagram illustrating a constitution of the history display apparatus practiced as the fifth embodiment of the invention. In FIG. 18, reference numeral 1800 indicates the history display apparatus associated with the present invention. Reference numeral 1801 indicates a history holding section for holding a history of the following by the user by reading the history from a memory unit 1806. Reference numeral 1802 indicates a history geographical information analyzing section for analyzing geographical information contained in the history. Reference numeral 1803 indicates a history structure analyzing section for analyzing the parentage of nodes.

Reference numeral 1804 indicates a history managing section for managing the result of analyzing the history. Reference numeral 1805 indicates a history display section for displaying the history analysis result by use of metaphor display along with a node connection relationship. Reference numeral 1808 indicates the memory unit for storing the user access history to be used by the history display apparatus 1500. Reference numeral 1807 indicates a display unit for displaying the processing result of the history display apparatus 1800.

Figure 19:
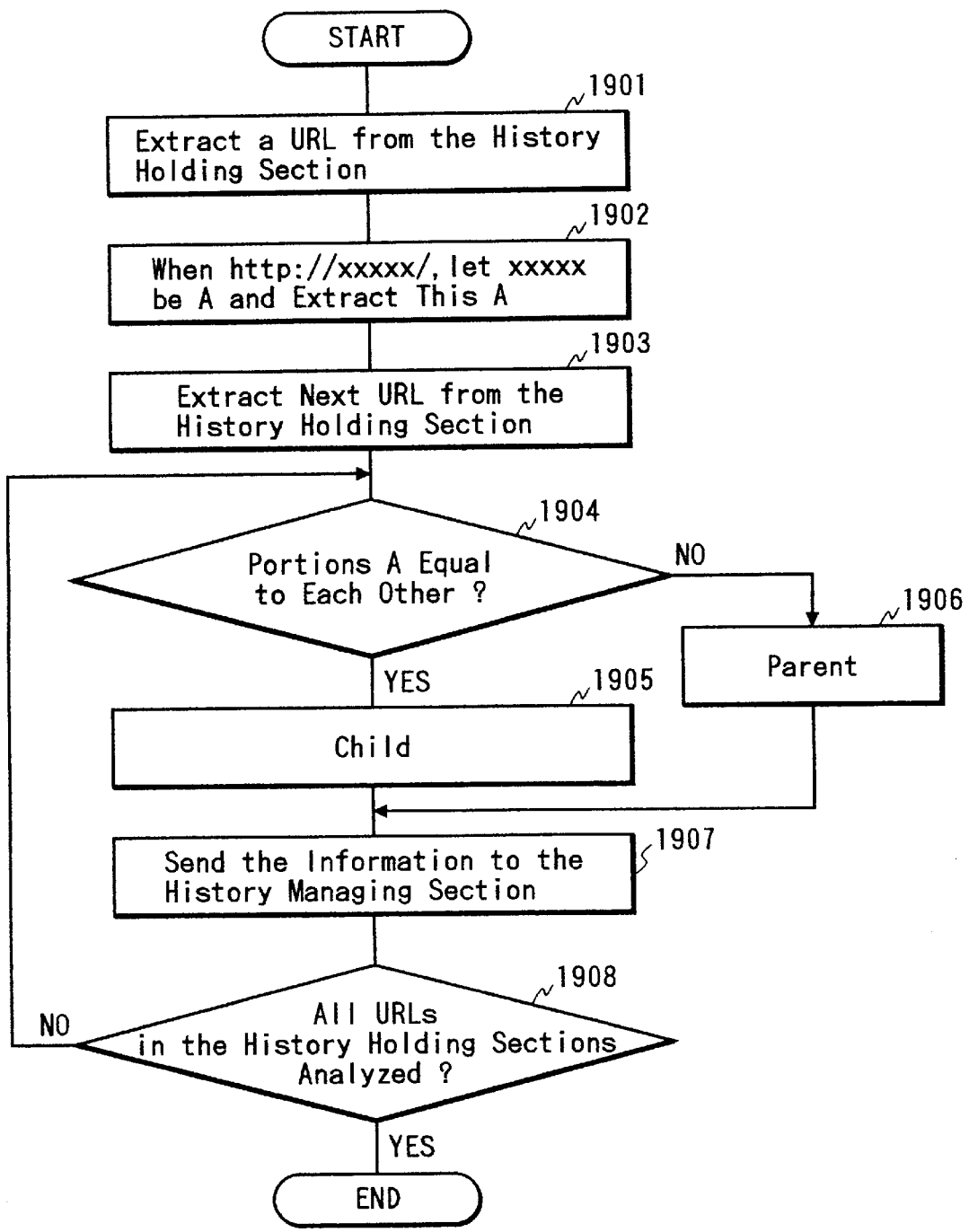
FIG. 19 is a flowchart indicating the processing by the history structure analyzing section in the fifth embodiment.

FIG. 19 is a flowchart indicating the processing by the history structure analyzing section 1803. In the history structure analyzing section 1803, a URL is first extracted to extract "*" portion of http://***********/ as A (steps 1901 and 1902). Then, a next URL is extracted to compare a portion A with the portion A extracted in the preceding step (steps 1903 and 1904). If a match is found, they are children; if no match if found, they are parents (steps 1905 and 1906). For example, as shown in FIG. 20, let portion "www.me-i.co.jp" be A, then URLs having portion A in common are children of parent http://A/ regardless of the contents of the directory following the portion A.

FIG. 21 shows an example of history. According to the above-mentioned algorithm, it may be regarded that 2103, 2104, and 2105 form a group of which parent is 2103, and 2107, 2108, and 2109 form a group of which parent is 2107. These analysis results are passed to the history managing section 1804 (step 1907). This analysis is performed on all URLs (step 1908).

Figure 23:
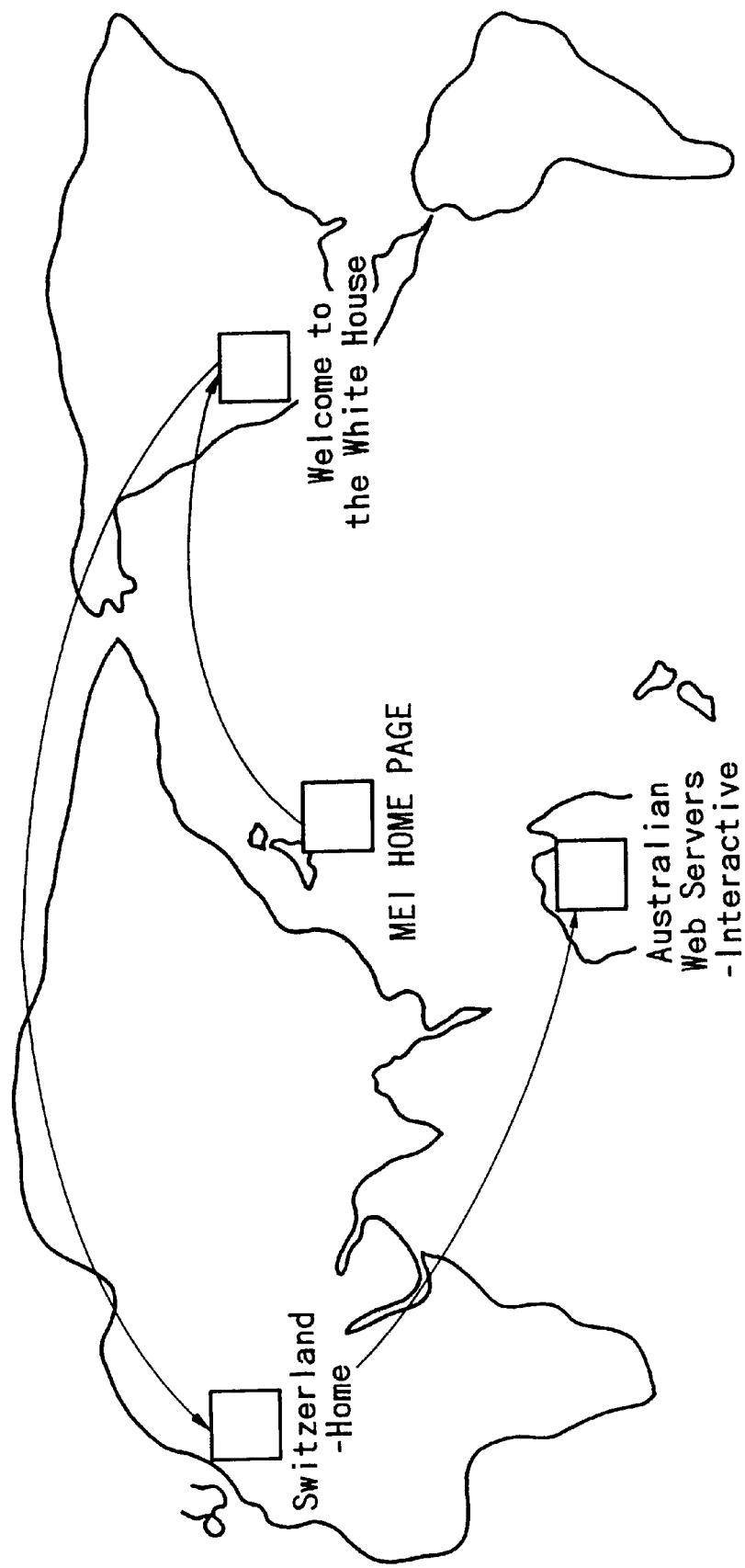
FIG. 23 is a history map with information by country displaying only the parent nodes in the fifth embodiment.

In the history managing section 1804, the result obtained in the history structure analyzing section 1803 is added to the table as with the first embodiment. FIG. 22 shows an example of the control table resulted from analyzing the parentage of the pages held in the history managing section 1804. Then, the history display section 1805 displays only the parent pages along with a page connection relationship onto a map form the information of the history managing section 1804. FIG. 23 shows a history map with information by country that shows only the parent nodes displayed on the display unit 1807 by the history display section 1805.

As described and according to the present embodiment, in the system having a hypermedia structure in which a user moves from one information source to another by following links provided between nodes, not all the nodes are displayed but, as for a group of nodes having parentage, only a parent node is displayed, thereby expressing a relationship between the nodes and the links on map around a main page with more ease of understanding and simplicity.

It should be appreciated that the present embodiment can be practiced in combination with any of the first through fourth embodiments.

(Sixth Embodiment)

The following describes in detail the sixth embodiment with reference to drawings. The sixth embodiment differs from the fifth embodiment in that an operation history acquiring section for acquiring user operation history information is provided instead of the history geographical information analyzing section and the history display section displays time axis and node parentage are displayed of the structures held in the history.

Figure 24:
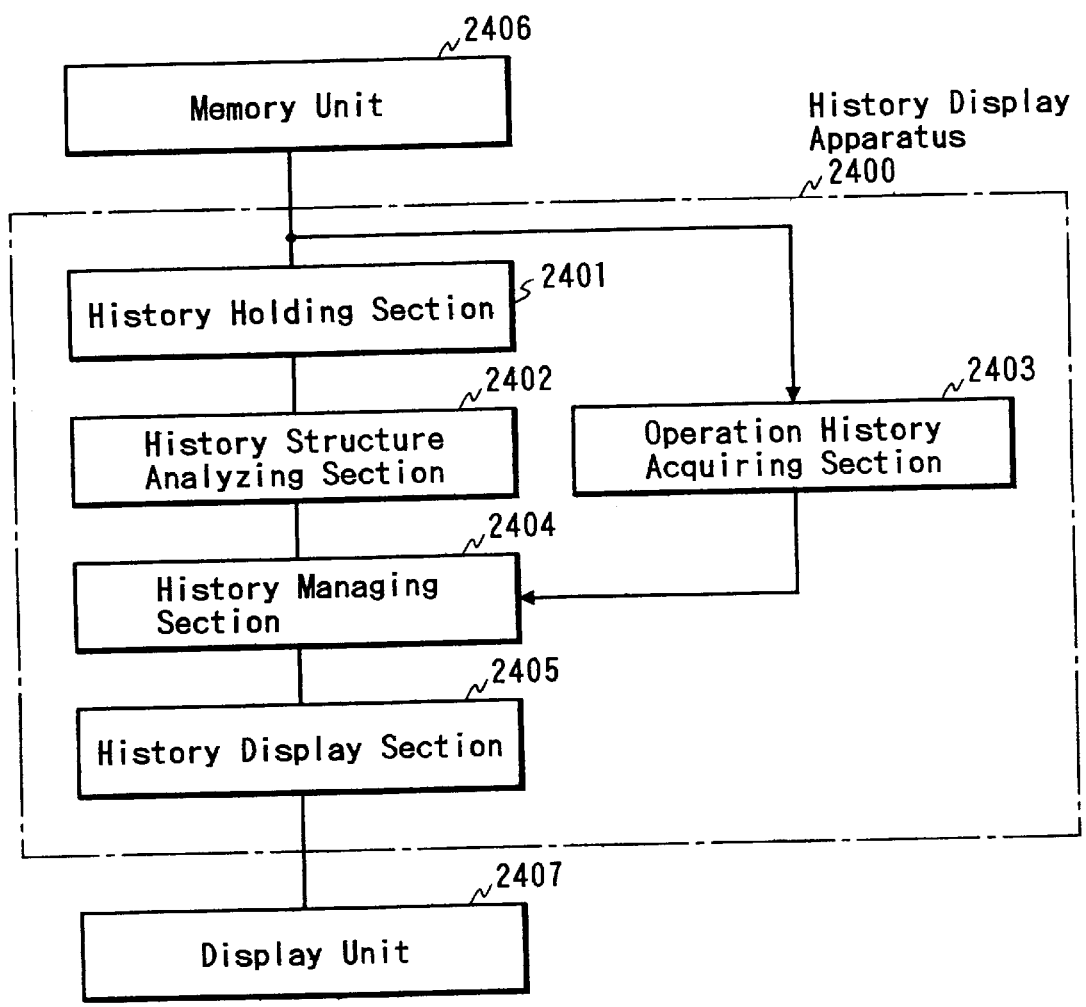
FIG. 24 is a block diagram illustrating a constitution of the history display apparatus in the sixth embodiment of the invention.

FIG. 24 is a block diagram illustrating a constitution of the history display apparatus practiced as the sixth embodiment of the invention. In FIG. 24, reference numeral 2400 indicates the history display apparatus associated with the present invention. Reference numeral 2401 indicates a history holding section for holding a history of the following by the user by reading the history from a memory unit 2406. Reference numeral 2401 indicates a history structure analyzing section for analyzing the parentage of nodes. Reference numeral 2403 indicates an operation history acquiring section for acquiring user operation history information. Reference numeral 2404 indicates a history managing section for managing the result of analyzing the history. Reference numeral 2405 indicates a history display section for displaying the history analysis result by use of metaphor display along with a node connection relationship. Reference numeral 2406 indicates the memory unit for storing the user access history to be used by the history display apparatus 2400. Reference numeral 2407 indicates a display unit for displaying the processing result of the history display apparatus 2400.

Figure 25:
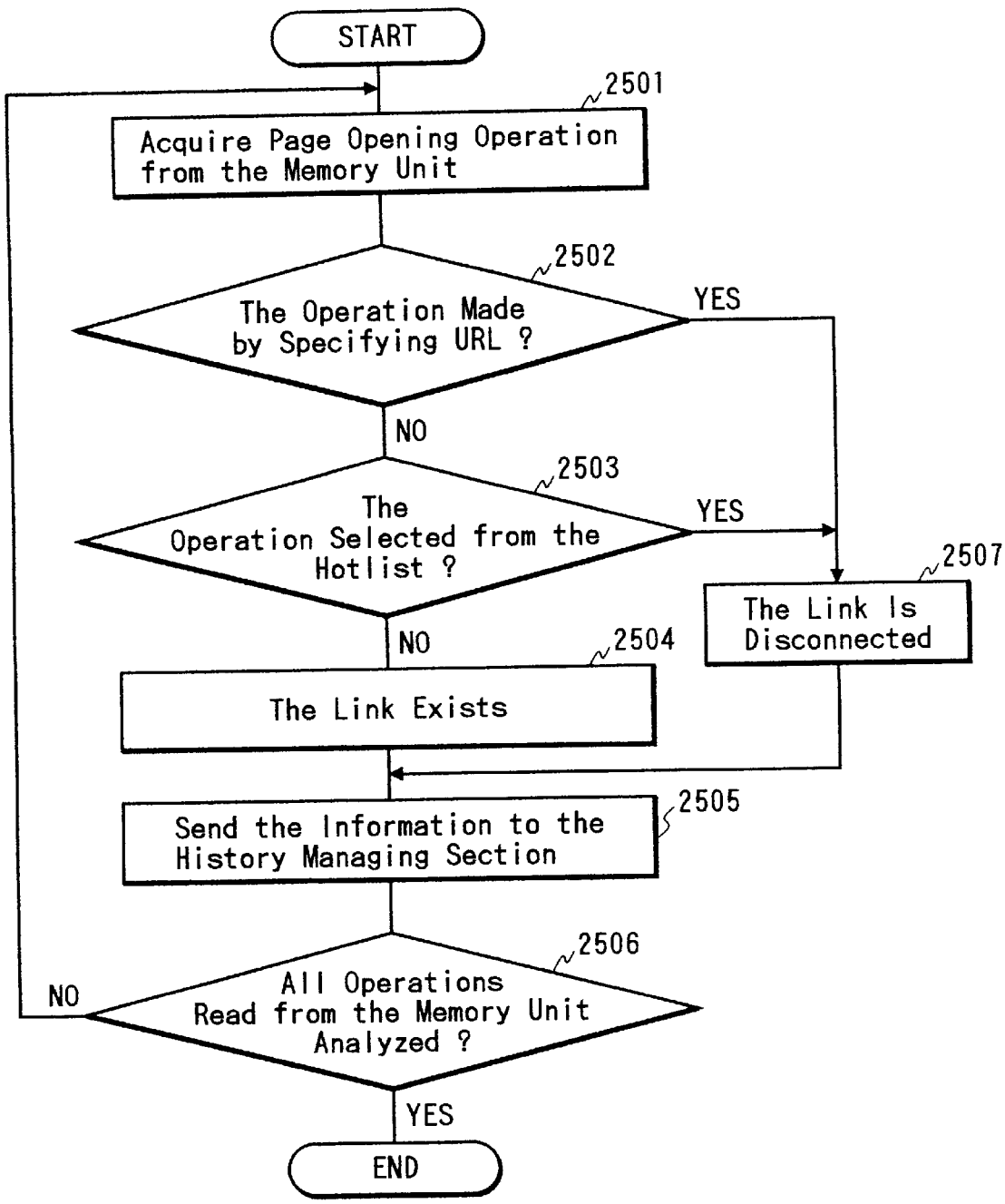
FIG. 25 is a flowchart indicating the processing by the operation history acquiring section in the sixth embodiment.

FIG. 25 is a flowchart indicating the processing by the operation history acquiring section 2403. In the operation history acquiring section 2403, the user first acquires the operation for opening a page from the memory unit 2406 (step 2501) and captures the history of the operation for opening a next page by following the link starting with the currently browsed page, opening a page by specifying the location of the URL, or opening a page by selecting the page from a Hotlist entered in advance (steps 2502 and 2503). It is determined that the link is disconnected for the specification of the URL location and the selection from the host list (step 2507) and the link exists otherwise (step 2504). The result of the determination is passed to the history managing section 2405 (step 2505). This processing is performed on all operations (step 2506).

In the history managing section 2405, the result obtained in the operation history acquiring section 2403 is added to the table as with the fifth embodiment. FIG. 26 shows an example of the control table resulted from analyzing the user operation history information held in the history managing section 2405. Based on time axis and node parentage, of the link states (the link is established and the link is disconnected) and the structures held in the history, the history display section 2405 gives a display instruction so that parentage is known. FIG. 27 shows the history map displayed on the display unit 2407 by the history display section 2405, which is easily understood by a novice user or a user not well familiar with a computer.

As described and according to the sixth embodiment, in the system having a hypermedia structure in which a user moves from one information source to another by following links provided between nodes, parentage of the nodes is analyzed and the time axis and node parentage necessary for identifying not all link information in a history but a desired node in a structure held in the history are displayed by use of metaphor display, thereby allowing the user who is novice or not well familiar with computers to understand the system easily.

It should be appreciated that the present embodiment can be practiced in combination with any of the first through fifth embodiments.

(Seventh Embodiment)

The following describes in detail the seventh embodiment with reference to drawings. The seventh embodiment differs from the above-mentioned sixth embodiment in that a system status acquiring section for getting system status is provided.

Figure 28:
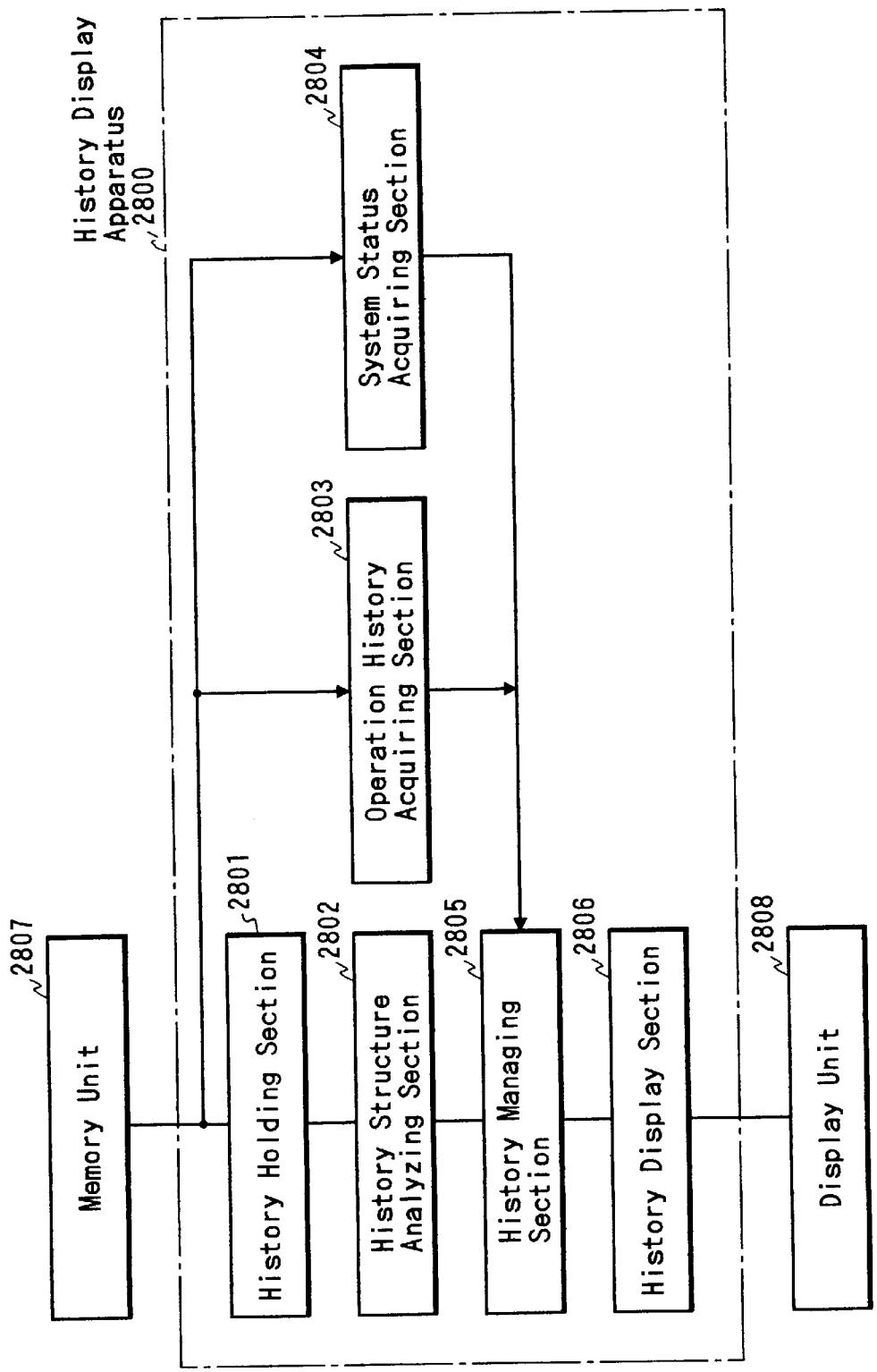
FIG. 28 is a block diagram illustrating a constitution of the history display apparatus practiced as the seventh embodiment of the invention.

FIG. 28 is a block diagram illustrating a constitution of the history display apparatus practiced as the seventh embodiment of the invention. In FIG. 28, reference numeral 2800 indicates the history display apparatus associated with the present invention. Reference numeral 2801 indicates a history holding section for holding a history of the following by the user by reading the history from a memory unit 2807. Reference numeral 2802 indicates a history structure analyzing section for analyzing the parentage of nodes. Reference numeral 2803 indicates an operation history acquiring section for acquiring user operation history information. Reference numeral 2804 indicates a system status acquiring section for getting system status. Reference numeral 2805 indicates a history managing section for managing the result of analyzing the history. Reference numeral 2806 indicates a history display section for displaying the history analysis result by use of metaphor display along with a node connection relationship. Reference numeral 2807 indicates the memory unit for storing the user access history to be used by the history display apparatus 2800. Reference numeral 2808 indicates a display unit for displaying the processing result of the history display apparatus 2800.

Figure 29:
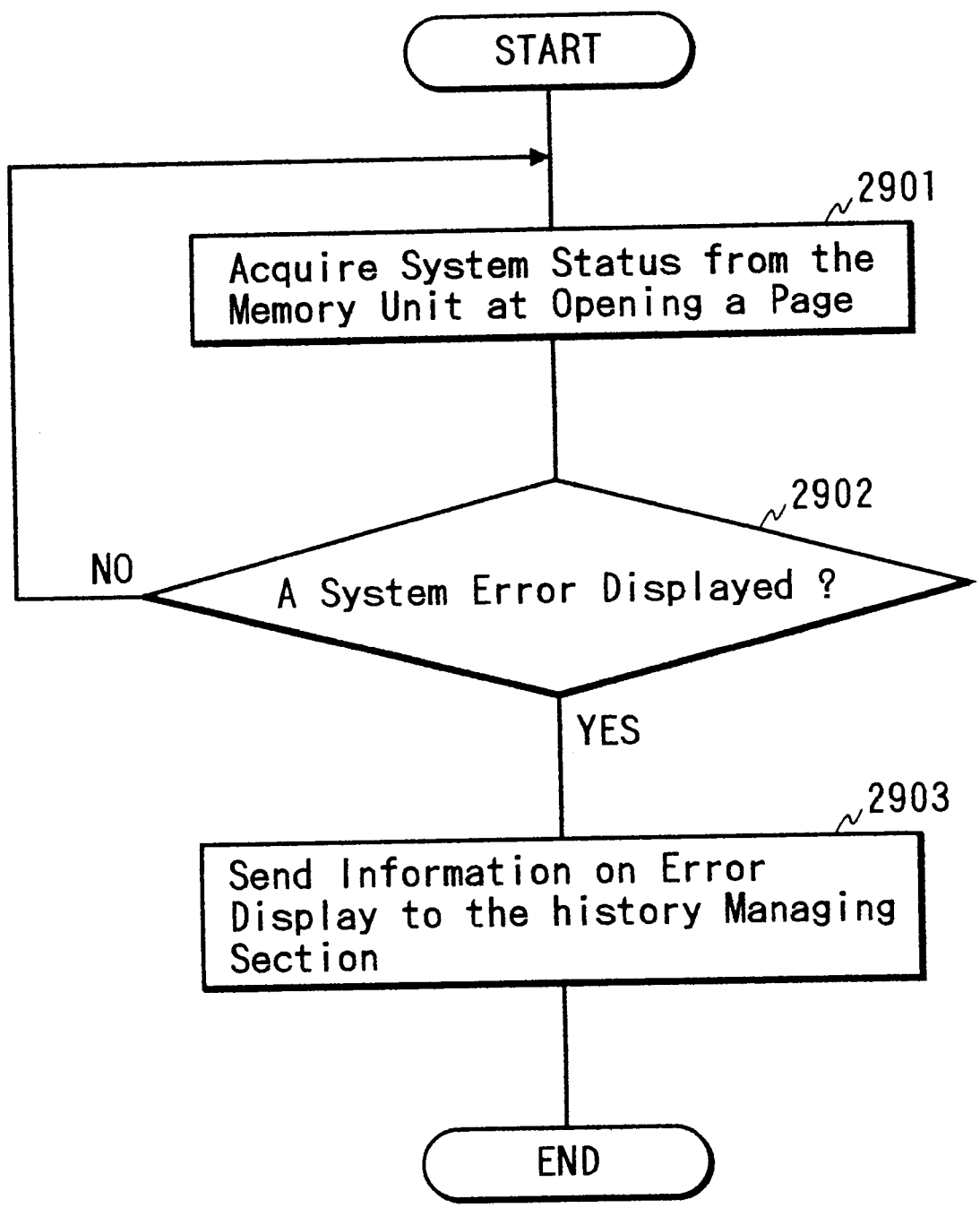
FIG. 29 is a flowchart indicating the processing by system status acquiring section in the seventh embodiment.
Figure 31:
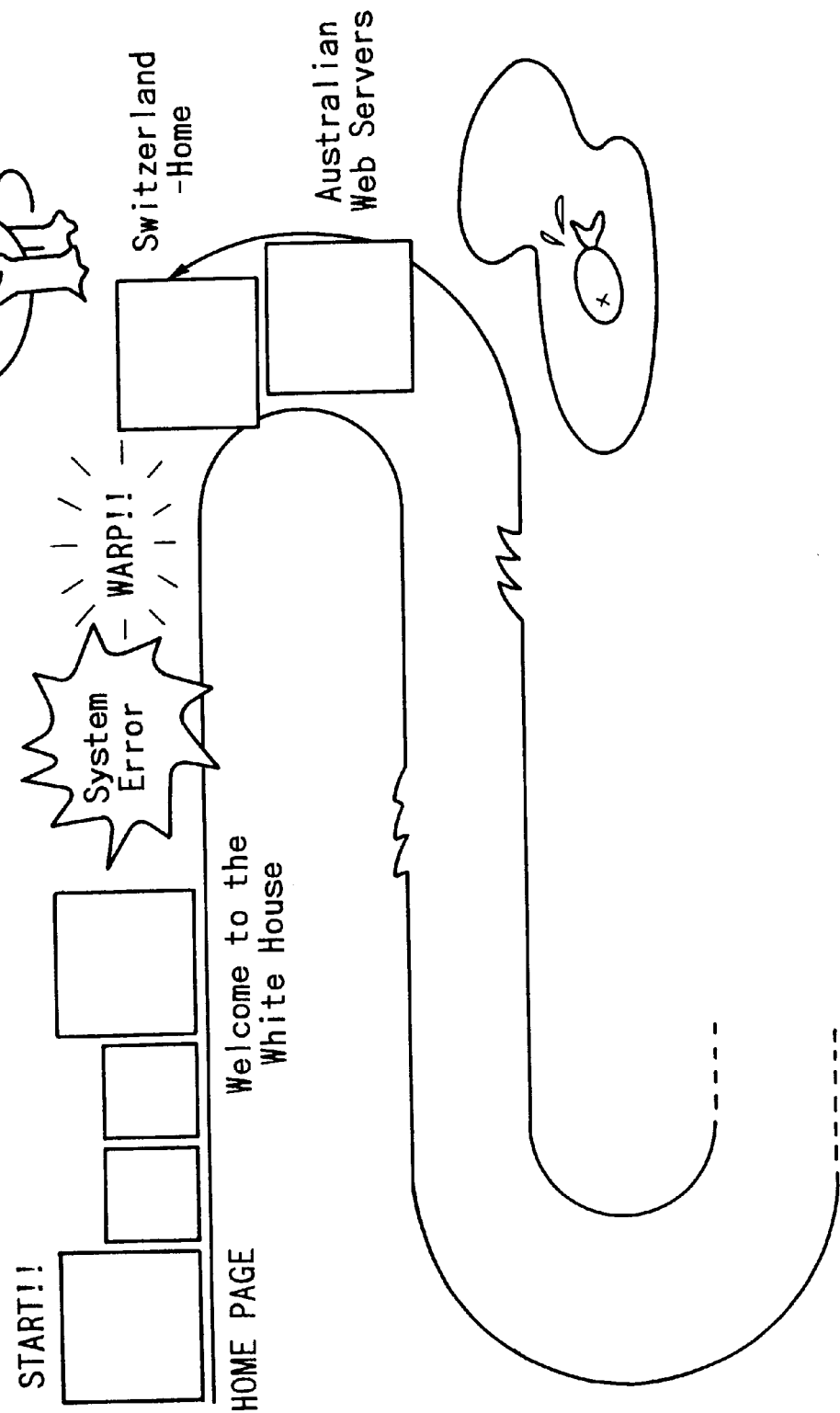
FIG. 31 is a history map added with information about the systems status in the seventh embodiment that can be easily understood also by those users who are novice or unfamiliar with computers.

FIG. 29 is a flowchart indicating the processing by the system status acquiring section 2804. In the system status acquiring section 2804, information indicating whether a page was normally displayed or some error was encountered when the page had been read (step 2901). If some error was encountered (step 2902), the information thereof is passed to the history managing section 2806 (step 2903). In the history managing section 2806, the result obtained in the system status acquiring section 2804 is added to the table as with the sixth embodiment. FIG. 30 shows an example of the control table resulted from getting the system status held in the history managing section 2805. Along with this information, the history display section 2806 makes an instruction of display as with the sixth embodiment. FIG. 31 shows a history map displayed on the display unit 2808 by the history display section 2806. Addition of the system status information allows a novice user or a user not well familiar with computer to understand the history more easily.

As described and according to the seventh embodiment, in the system having a hypermedia structure in which a user moves from one information source to another by following links provided between nodes, a system status is analyzed and a result of the analysis is displayed along with a history by use of a metaphor, thereby increasing the number of clues to allow the user to identify a desired node more easily.

It should be appreciated that the present embodiment can be practiced in combination with any of the first through sixth embodiments.

(Eighth Embodiment)

The following describes in detail the eighth embodiment with reference to drawings. The eighth embodiment differs from the second embodiment in that a type input section by which the user enters node types and a type data holding section for holding the nodes and types entered from the type input section, in the form of a list.

FIG. 32 is a block diagram illustrating a constitution of the history display apparatus practiced as the eighth embodiment of the invention. In FIG. 32, reference numeral 3200 indicates the history display apparatus associated with the present invention. Reference numeral 3201 indicates a history holding section for holding a history of the following by the user by reading the history from a memory unit 3207. Reference numeral 3202 indicates a history type analyzing section for determining a type to which each of the nodes in history accessed by the user by referencing the list of types and nodes held in a type data holding section 3206. Reference numeral 3203 indicates a history managing section for managing the result of analyzing the history. Reference numeral 3204 indicates a history display section for displaying the history analysis result by use of metaphor display along with a node connection relationship. Reference numeral 3205 indicates a type input section for entering node types. Reference numeral 3206 indicates the type data holding section for holding the entered nodes and types in a list. Reference numeral 3207 indicates the memory unit for storing the user access history to be used by the history display apparatus 3200. Reference numeral 3208 indicates a display unit for displaying the processing result of the history display apparatus 2800. Reference numeral 3209 indicates an input unit through which the user enters types into the type input section 3205.

The type input section 3205 has a type classification beforehand. The user selects an appropriate type for a page concerned from the input unit 3209. The type input section 3205 passes the entry by the user to the type data holding section 3206. The type data holding section 3206 holds the page and the type in a pair in a list form as a database. By the above-mentioned procedure, the type data holding section 3206 holds the page and type data increasingly as the user accesses more pages. The history type analyzing section 3202 obtains the type data by referencing the type data holding section 3206 as with the second embodiment. If no page concerned is found after referencing the type data holding section 3206, the history type analyzing section 3202 prompts the user to enter another type through the type input section 3205.

As described and according to the eighth embodiment, in the system having a hypermedia structure in which a user moves from one information source to another by following links provided between nodes, the user enters a desired type and holds a result of the entry in the form of a list, by which a type list matching a conceptual system of the user for the type and a clue namely type information better matching the consciousness of the user is provided, thereby allowing the user, thereby allowing the user to intuitively comprehend the nodes in a sense of a map of routes followed by the user among the information sources based on the type information.

Effects of the Invention

As mentioned above and according to the invention, in the system having a hypermedia structure in which a user moves from one information source to another by following links provided between nodes, the following advantageous effects can be obtained.

First, geographical information is analyzed based on a history of the following of the links by the user and a result of the analysis along with a connection relationship of the nodes is displayed by use of metaphor display, thus implementing a history display apparatus that allows the user to have a new clue namely the geographical information and intuitively comprehend the nodes in a sense of a map of routes followed by the user among the information sources by displaying the geographical information on the map.

Second, a type of a history of the following of the links by the user is analyzed by referencing a node list containing a list of nodes by type and a result of the analysis along with a connection relationship of the nodes is displayed by use of metaphor display, thus implementing a history display apparatus that allows the user to have type information and intuitively comprehend the nodes in a sense of a map of routes followed by the user among the information sources based on the type information.

Third, information about frequency of access to each of the nodes based on a history of the follow-up by the user is analyzed and the access frequency information is expressed on a map along with a connection relationship of the nodes by a difference between node display states, thus implementing a history display apparatus that allows the user also to intuitively grasp the access frequency information about each of the nodes.

Fourth, access frequency information by area is collected and analyzed, a display state of a region to be mapped is varied, and a type/region frequently accessed and a type/region seldom accessed are expressed by a difference between display states, thus implementing a history display apparatus that expresses a trend of user preferences visually.

Fifth, node parentage is analyzed and not all the nodes are displayed but, as for a group of nodes having parentage, only a parent node is displayed, thus implementing a history display apparatus that expresses a relationship between the nodes and the links on map around a main page with more ease of understanding and simplicity.

Sixth, parentage of the nodes is analyzed and the time axis and node parentage necessary for identifying not all link information in a history but a desired node in a structure held in the history are displayed by use of metaphor display, thus implementing a history display apparatus that allows the user who is novice or not well familiar with computers to understand the system easily.

Seventh, a system status is analyzed and a result of the analysis is displayed along with a history by use of a metaphor, thus implementing a history display apparatus that increases the number of clues to allow the user to identify a desired node more easily.

Eighth, the user enters a desired type and holds a result of the entry in the form of a list, by which a type list matching a conceptual system of the user for the type and a clue namely type information better matching the consciousness of the user is provided, thus implementing a history display apparatus that allows the user to intuitively comprehend the nodes in a sense of a map of routes followed by the user among the information sources based on the type information.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A history display apparatus as used in a system having a hypermedia structure in which a user moves from one information source to another by following links provided between nodes of the structure, said history display apparatus comprising:

a history storing section for storing a history of the links followed by the user;

a history geographical information analyzing section for analyzing geographical information associated with the history stored by the history storing section;

a history managing section for managing results obtained by analyzing the history stored by the history storing section; and a history display section using a two-dimensional metaphor display specifying a source node to destination node connection, said history display section displaying the analysis results.

2. A history display apparatus as used in a system having a hypermedia structure in which a user moves from one information source to another by following links provided between nodes of the structure, said history display apparatus comprising:

a history storing section for storing a history of the links followed by the user;

a history type analyzing section;

a history managing section for managing results obtained by analysis of the history by said history type analyzing section; and a history display section using a two-dimensional metaphor display specifying a source node to destination node connection, said history display section displaying the analysis results by said history type analyzing section;

wherein said history type analyzing section contains a node list identifying nodes by type, said history type analyzing section analyzing said history by referring to said node list to determine a type of each of the nodes in the history of the links followed by the user.

3. The history display apparatus according to claim 1 comprising:

an access frequency information acquiring section for acquiring frequency of access by the user to each of the nodes; and a history display control section for changing display states of each of the nodes according the access frequency thereof;

wherein said history display apparatus also displays the access frequency information.

4. The history display apparatus according to claim 1 comprising:

an area-classified frequency information collecting section for collecting information about access frequency by area; and a history display control section for changing display states of a region to be mapped according to access frequency, thereby varying a portion to be mapped;

wherein said history display apparatus also displays information about access frequency by region or type.

5. The history display apparatus according to claim 1 comprising a history structure analyzing section for analyzing parentage of the nodes, wherein said history display section displays not the history of all of the nodes but the history in units of a parent node having a child node.

6. A history display apparatus as used in a system having a hypermedia structure in which a user moves from one information source to another by following links provided between nodes of the structure, said history display apparatus comprising:

a history storing section for storing a history of the links followed by the user;

an operation history acquiring section for acquiring a history of operations performed by the user in following the links;

a history managing section for managing results obtained by analyzing the history; and a history display section using a metaphor display, said history display section displaying the history of operations along with a node connection information;

wherein said history display section further displays, by use of metaphor display, a time axis and parentage of nodes in the structure stored in the history storing section.

7. The history display apparatus according to claim 1 comprising a system status acquiring section for acquiring system status, wherein said history display section displays the system status.

8. The history display apparatus according to claim 2 comprising:

a type input section for the user to enter type of the nodes; and a type data holding section for holding the nodes and type entered from said type input section in a list.

9. A history display apparatus in a system having a hypermedia structure in which a user moves among information sources by following links provided between nodes, wherein geographical information is analyzed based on a history of the following of the links by the user and a result of the analysis along with a connection relationship of the nodes is displayed by use of a two-dimensional metaphor display specifying a source node to destination node connection, thereby allowing the user to have a new clue namely the geographical information and intuitively comprehend the nodes as a map of routes followed by the user among the information sources by displaying the geographical information on the map.

10. A history display apparatus, in a system having a hypermedia structure in which a user moves among information sources by following links provided between nodes, wherein a type of a history of the following of the links by the user is analyzed by referencing a node list containing a list of nodes by type and a result of the analysis along with a connection relationship of the nodes is displayed by use of a two-dimensional metaphor display specifying a source node to destination node connection, thereby allowing the user to have type information and intuitively comprehend the nodes as a map of routes followed by the user among the information sources based on the type information.

11. A history display apparatus in a system having a hypermedia structure in which a user moves among information sources by following links provided between nodes, wherein information about frequency of access to each of the nodes is analyzed based on a history of the follow-up by the user and the access frequency information is expressed on a two-dimensional map as a display specifying a source node to destination node connection by a difference between node display states, thereby allowing the user also to intuitively grasp the access frequency information about each of the nodes.

12. A history display apparatus in a system having a hypermedia structure in which a user moves among information sources by following links provided between nodes, wherein access frequency information by area is collected and analyzed, a display state of a region to be mapped is varied, and a type/region frequently accessed and a type/region seldom accessed are expressed by a difference between display states of a display specifying a source node to destination node connection, thereby expressing a trend of user preferences visually.

13. A history display apparatus in a system having a hypermedia structure in which a user moves among information sources by following links provided between nodes, wherein node parentage is analyzed and not all the nodes are displayed but, as for a group of nodes having parentage, only a parent node is displayed, thereby expressing a relationship between the nodes and the links on map around a main page with more ease of understanding and simplicity.

14. A history display apparatus in a system having a hypermedia structure in which a user moves among information sources by following links provided between nodes, wherein parentage of the nodes is analyzed and the time axis and node parentage necessary for identifying not all link information in a history but a desired node in a structure held in the history are displayed by use of metaphor display, thereby allowing the user who is novice or not well familiar with computers to understand the system easily.

15. A history display apparatus in a system having a hypermedia structure in which a user moves among information sources by following links provided between nodes, wherein a system status is analyzed and a result of the analysis is displayed along with a history by use of a two-dimensional metaphor specifying a source node to destination node connection, thereby increasing the number of clues to allow the user to identify a desired node more easily.

16. A history display apparatus in a system having a hypermedia structure in which a user moves among information sources by following links provided between nodes, wherein the user enters a desired type and holds a result of the entry in the form of a list, by which a type list matching a conceptual system of the user for the type and a clue namely type information better matching the consciousness of the user is provided on a display specifying a source node to destination node connection, thereby allowing the user to intuitively comprehend the nodes as a map of routes followed by the user among the information sources based on the type information.

* * * * *